US011955065B2

(12) United States Patent
Yuan

(10) Patent No.: US 11,955,065 B2
(45) Date of Patent: Apr. 9, 2024

(54) DISPLAY PANEL AND DISPLAY DEVICE

(71) Applicant: Xiamen Tianma Display Technology Co., Ltd., Xiamen (CN)

(72) Inventor: Yong Yuan, Wuhan (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/090,103

(22) Filed: Dec. 28, 2022

(65) Prior Publication Data

US 2024/0071291 A1 Feb. 29, 2024

(30) Foreign Application Priority Data

Aug. 24, 2022 (CN) ......................... 202211021496.1

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2340/0435* (2013.01)

(58) Field of Classification Search
CPC .. G09G 3/32; G09G 3/00; G09G 3/20; G09G 3/3233; G09G 3/3266; G09G 3/3258; G09G 3/3291; G09G 3/3275; G09G 3/3241; G09G 3/3208
See application file for complete search history.

(56) References Cited

U.S. PATENT DOCUMENTS

2018/0166025 A1* 6/2018 Zhou .................... G09G 3/3233
2020/0066212 A1* 2/2020 Kim ..................... G09G 3/3233
2020/0105192 A1* 4/2020 Nam .................... G09G 3/3233
2021/0027696 A1* 1/2021 Kim .......................... G09G 3/32
2021/0256911 A1* 8/2021 Lee ....................... G09G 3/3258
2021/0367122 A1* 11/2021 Park .......................... G09G 3/32
2022/0189408 A1* 6/2022 Jo ............................. G09G 5/00
2022/0351671 A1* 11/2022 Xu ........................ G09G 3/3233
2023/0098040 A1* 3/2023 Zhou ..................... G09G 3/3233 345/55
2023/0138675 A1* 5/2023 Xia ....................... G09G 3/3233 345/211
2023/0154389 A1* 5/2023 Park ..................... G09G 3/3233 345/55
2023/0178003 A1* 6/2023 Kim .......................... G09G 3/32 345/55

* cited by examiner

*Primary Examiner* — Chanh D Nguyen
*Assistant Examiner* — Nguyen H Truong
(74) *Attorney, Agent, or Firm* — Anova Law Group, PLLC

(57) ABSTRACT

A display panel and a display device are provided. The display panel includes a pixel circuit including a driving transistor and a preset module, a light-emitting element and a gating module. A first terminal of the preset module is connected to the driving transistor, and a second terminal of the preset module is connected to a preset signal terminal or the driving transistor, a control terminal of the preset module is connected to a control signal line, a control terminal of the gating module is connected to a gating signal line configured for receiving a gating signal, the gating module is connected between the control terminal of the preset module and the control signal line, or between the first terminal of the preset module and the driving transistor, or between the second terminal of the preset module and the preset signal terminal or the driving transistor.

15 Claims, 27 Drawing Sheets

DISPLAY PANEL AND DISPLAY DEVICE

CROSS-REFERENCE TO RELATED APPLICATION

This application claims the priority of Chinese Patent Application No. 202211021496.1, filed on Aug. 24, 2022, the content of which is incorporated by reference in its entirety.

TECHNICAL FIELD

The present disclosure generally relates to the field of display technologies and, more particularly, relates to a display panel and a display device.

BACKGROUND

With the development of the display technologies, while the display size of the display device is designed to be increased, different display areas can be designed to present different display contents at the same time, such as in a foldable mobile phone. When different display areas display different contents, the optimal refresh frequencies corresponding to different display areas are different. However, in the current display device, the screen refresh frequency of the entire display area is consistent, thus the display device cannot achieve an optimal display effect.

The present disclosed display panels and display devices are direct to solve one or more problems set forth above and other problems in the arts.

SUMMARY

One aspect of the present disclosure provides a display panel. The display panel includes a pixel circuit including a driving transistor and a preset module. A first terminal of the preset module is connected to the driving transistor, a second terminal of the preset module is connected to a preset signal terminal or the driving transistor, and a control terminal of the preset module is connected to a control signal line configured for receiving a control signal. The display panel also includes a light-emitting element; and a gating module. A control terminal of the gating module is connected to a gating signal line that is configured for receiving a gating signal, the gating module is connected between the control terminal of the preset module and the control signal line, or the gating module is connected between the first terminal of the preset module and the driving transistor, or the gating module is connected between the second terminal of the preset module and the preset signal terminal or the driving transistor.

Another aspect of the present disclosure provides a display device. The display device includes a display panel. The display panel includes a pixel circuit including a driving transistor and a preset module. A first terminal of the preset module is connected to the driving transistor, a second terminal of the preset module is connected to a preset signal terminal or connected to the driving transistor, and a control terminal of the preset module is connected to a control signal line configured for receiving a control signal. The display panel also includes a light-emitting element; and a gating module. A control terminal of the gating module is connected to a gating signal line configured for receiving a gating signal, the gating module is connected between the control terminal of the preset module and the control signal line, or the gating module is connected between the first terminal of the preset module and the driving transistor, or the gating module is connected between the second terminal of the preset module and the preset signal terminal or the driving transistor.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Figure 1:
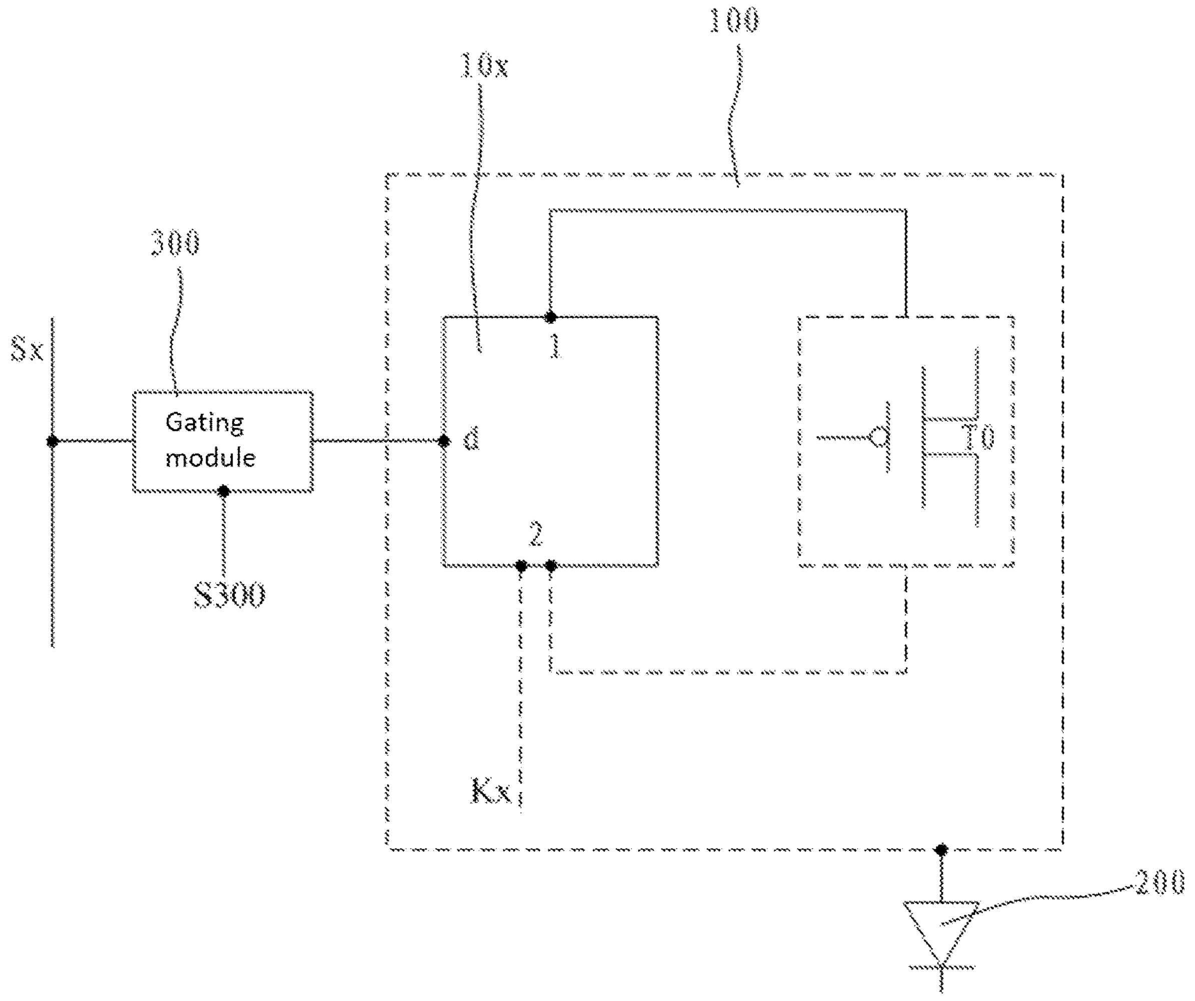
FIG. 1 illustrates an exemplary display panel according to various disclosed embodiments of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments of the present disclosure, all other embodiments obtained by those of ordinary skill in the art without creative efforts shall fall within the protection scope of the present disclosure.

As described in the background art, with the development of the display technologies, while the display size of the display device is designed to be increased, different display areas can be designed to simultaneously present different display contents, such as a foldable mobile phone. When different display areas display different contents, the optimal refresh frequencies corresponding to different display areas are different. However, in the current display device, the screen refresh frequency of the entire display area is consistent, thus the display device cannot achieve an optimal display effect.

The present disclosure provides a display panel and a display device, which may effectively solve the existing technical problems. By optimizing the operating frequency of the gating module, it may be possible to realize different screen refresh frequencies in different display areas of the display panel without changing the pulse change frequency of the control signal outputted by the driving circuit of the display device to ensure the display effect of the display device.

To achieve the above purposes, the technical solutions provided by the embodiments of the present disclosure are as following, and the technical solutions provided by the embodiments of the present disclosure are described in detail with reference to FIG. 1 to FIG. 27.

The present disclosure provides a display panel. FIGS. 1-4 are schematic structural diagrams of four exemplary display panels according to various disclosed embodiments of the present disclosure. As shown in FIGS. 1-4, an exemplary display panel may include a pixel circuit 100 and a light-emitting element 200. The pixel circuit 100 may include a driving transistor T0 and a preset module 10*x*. The first terminal 1 of the preset module 10*x* may be connected to a terminal of the driving transistor T0. The second terminal 2 of the preset module 10*x* may be connected to the preset signal terminal Kx or may be connected to the other terminal of the driving transistor T0. The control terminal d of the preset module 10*x* may be connected to a control signal line Sx, and the control signal line Sx may be configured for receiving a control signal.

The display panel may also include a gating module 300. The control terminal of the gating module 300 may be connected to a gating signal line S300, and the gating signal line S300 may be configured for receiving a gating signal.

Figure 2:
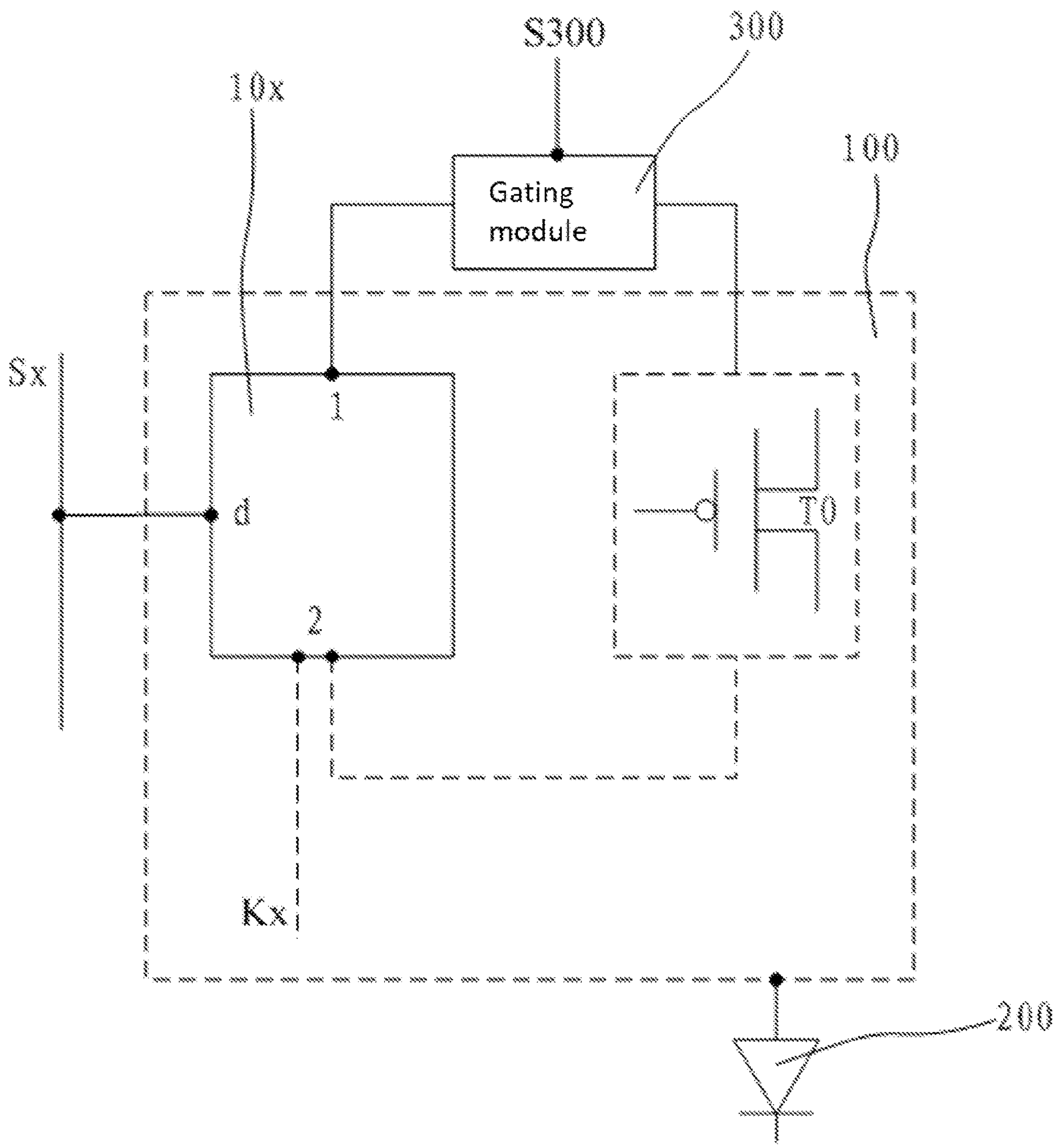
FIG. 2 illustrates another exemplary display panel according to various disclosed embodiments of the present disclosure.
Figure 3:
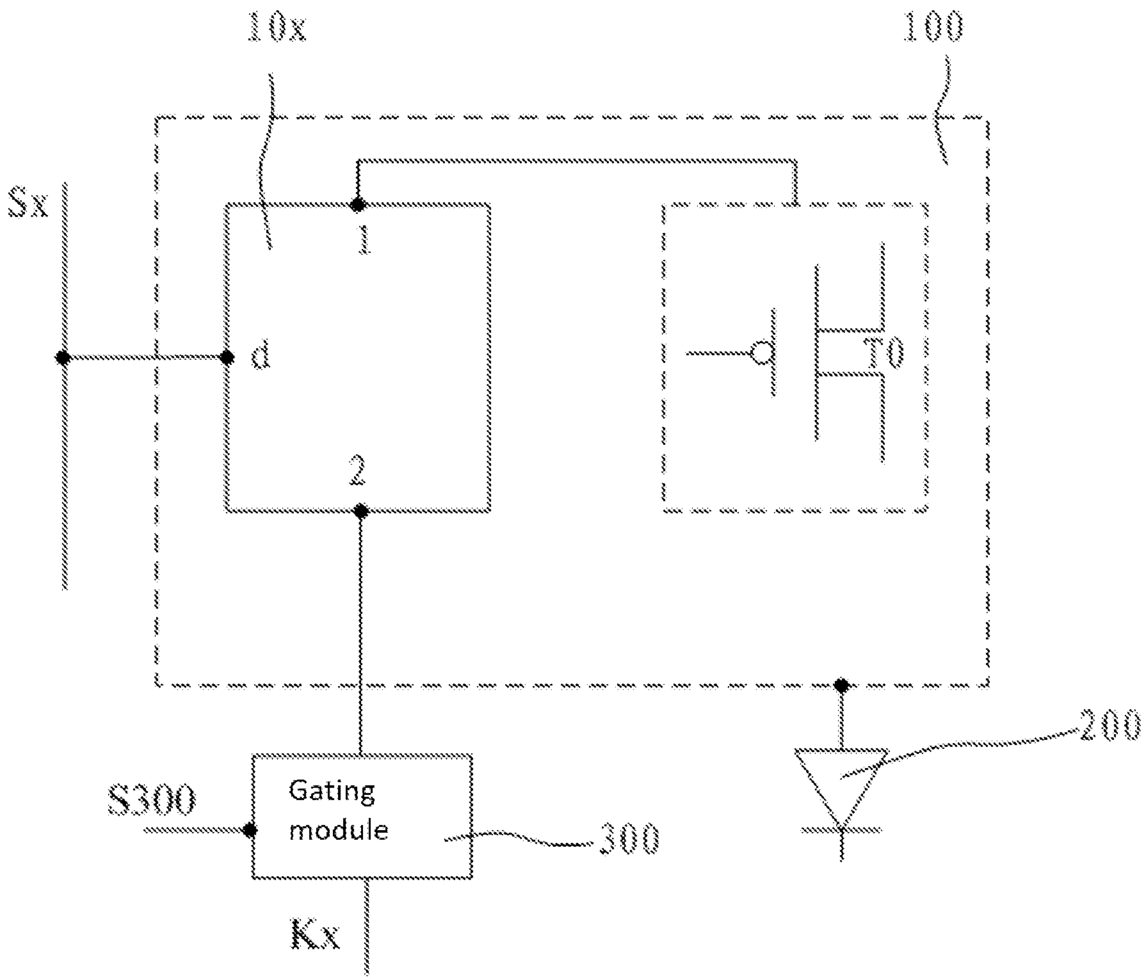
FIG. 3 illustrates another exemplary display panel according to various disclosed embodiments of the present disclosure.
Figure 4:
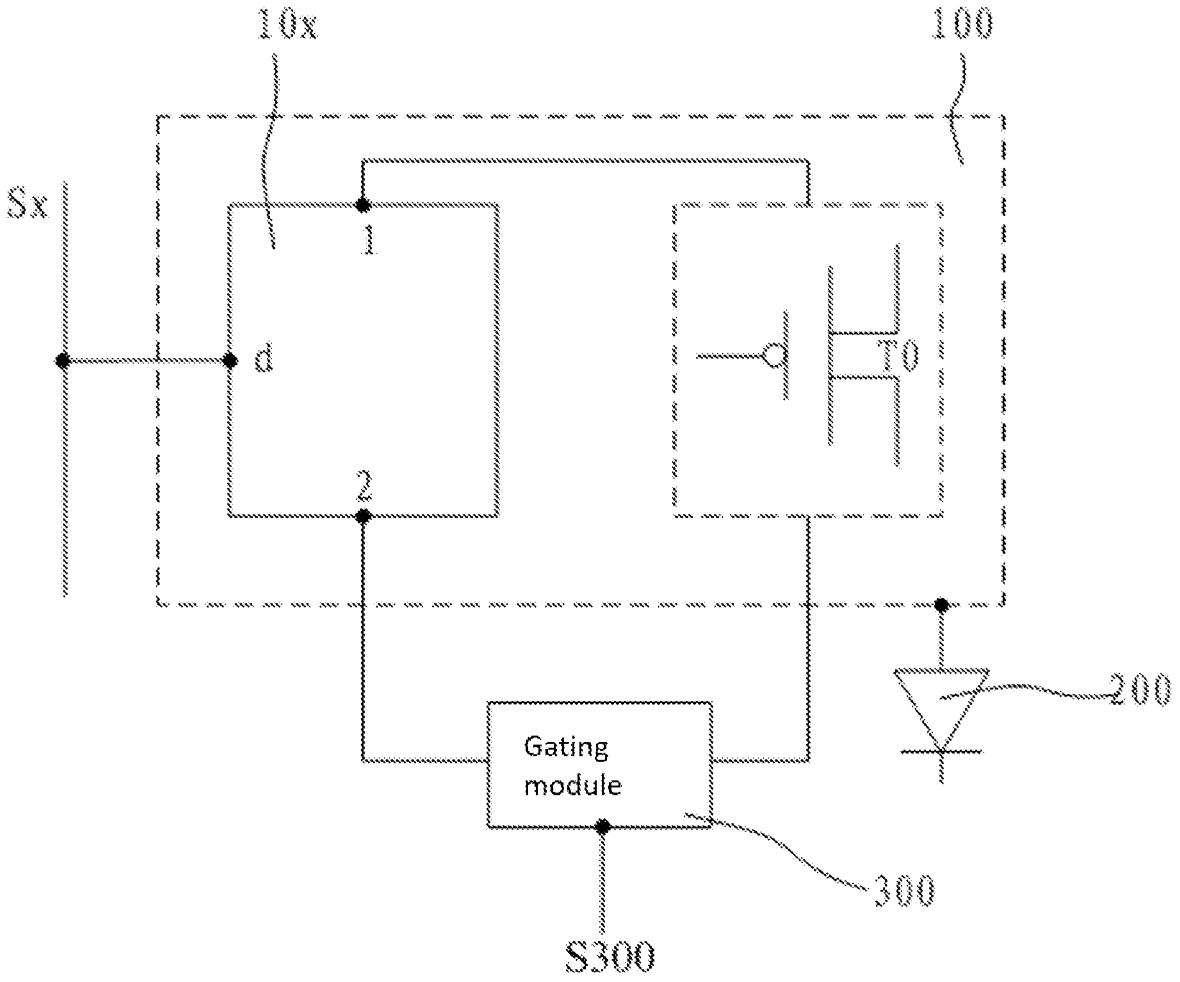
FIG. 4 illustrates another exemplary display panel according to various disclosed embodiments of the present disclosure.

In one embodiment, as shown in FIG. 1, the gating module 300 may be connected between the control terminal d of the preset module 10*x* and the control signal line Sx. In another embodiment, as shown in FIG. 2, the gating module 300 may be connected between the first terminal 1 of the preset module 10*x* and the driving transistor T0. In another embodiment, as shown in FIG. 3, when the second terminal 2 of the preset module 10*x* is connected to the preset signal terminal Kx, the gating module 300 may be connected between the second terminal 2 of the preset module 10*x* and the preset signal terminal Kx. In another embodiment, as shown in FIG. 4, when the second terminal 2 of the preset module 10*x* is connected to the driving transistor T0, the gating module 300 may be connected between the second terminal 2 of the preset module 10*x* and the driving transistor T0.

The pixel circuit 100 may be configured to generate a driving current to control the light-emitting element 200 to light up, and the preset module 10*x* in the pixel circuit 100 may be configured to provide corresponding functional signals for the driving transistor T0 to cooperate with other circuits connected to the driving transistor T0 to achieve the purpose of driving the transistor to generate a driving current to light up the light-emitting element 100. For example, after the pixel circuit 100 controls the light-emitting element 200 to light up, the pixel circuit 100 may maintain the current driving current when the preset module 10*x* stops working, such that the light-emitting element 200 may maintain the current "on" status, and finally the pixel where the pixel circuit is located may maintain the current display screen.

It may be seen from the above analysis that, in the technical solution provided by the exemplary embodiments of the present disclosure, a gating module may be disposed between the preset module and the control signal line, or between the preset module and the driving transistor, or between the preset module and the preset signal terminal. By optimizing the operation frequency of the gating module, the purpose of changing the operation frequency of the pixel circuit may be achieved. For example, the technical solution provided by the embodiments of the present disclosure may realize the refresh of the different display areas of the display panel on the basis of not changing the pulse change frequency of the output control signal of the driving circuit of the display device by optimizing the frequency of the gating module during the operation.

The technical solutions provided by the embodiments of the present disclosure will be described in detail below with reference to the structure of specific pixel circuits.

Figure 5:
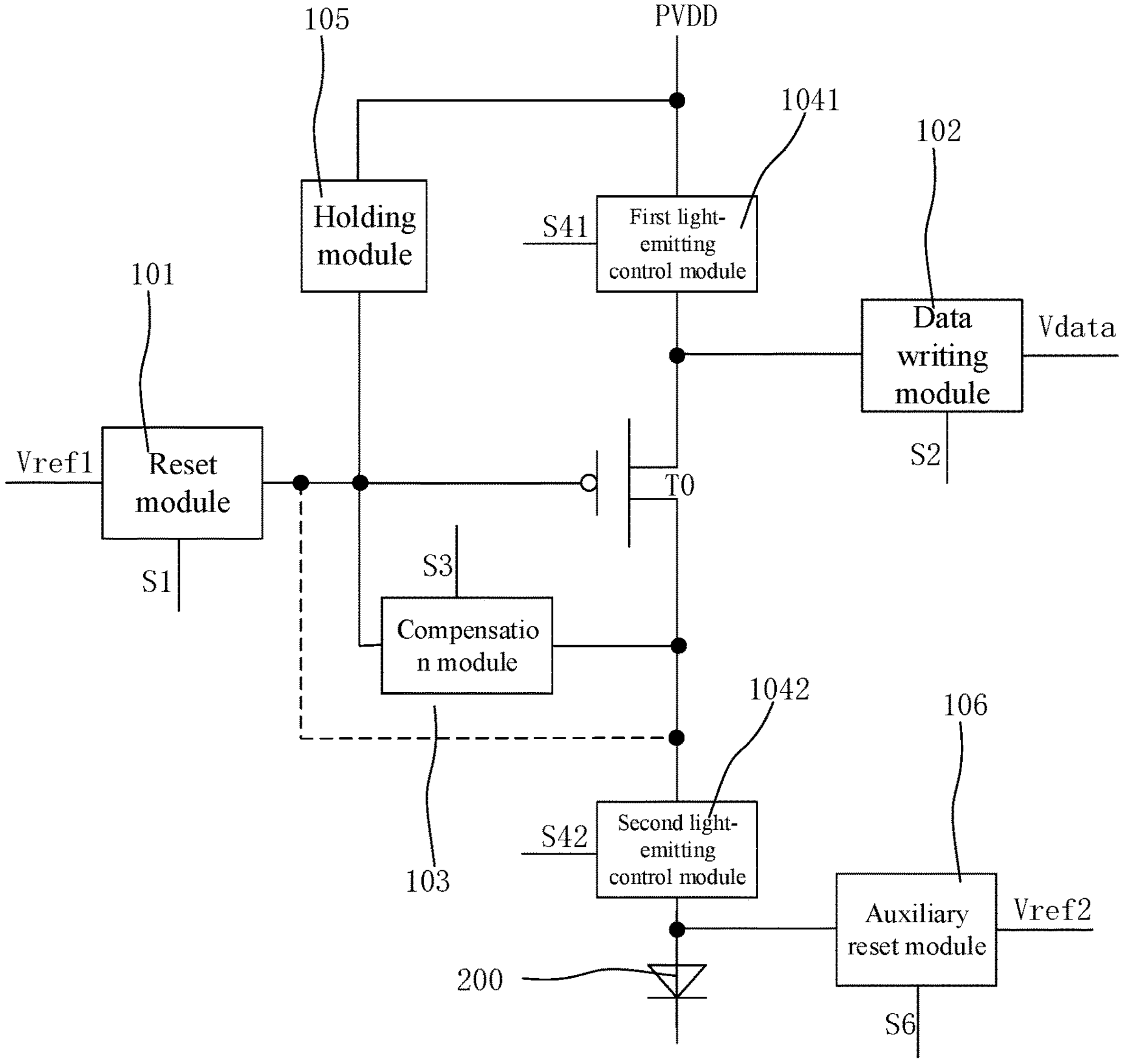
FIG. 5 illustrates an exemplary pixel circuit structure according to various disclosed embodiments of the present disclosure.

FIG. 5 illustrates an exemplary pixel circuit according to various disclosed embodiments of the present disclosure. As shown in FIG. 5, the pixel circuit of the display panel may include a driving transistor T0, a reset module 101, a data writing module 102, a compensation module 103, and a first light-emitting control module 1041, a second light-emitting control module 1042, a holding module 105 and an auxiliary reset module 106. The first terminal of the reset module 101 may be connected to the gate of the driving transistor T0 (or the first terminal of the reset module 101 may be connected to the second terminal of the driving transistor T0 as shown by the dotted line in FIG. 5), and the second terminal of the reset module 101 may be connected to the reset signal terminal Vref1, and the control terminal of the reset module 101 may be connected to the reset control signal line S1. The reset module 101 may be configured to provide a reset signal for the driving transistor T0.

The first terminal of the data writing module 102 may be connected to the first terminal of the driving transistor T0, the second terminal of the data writing module 102 may be connected to the data signal terminal Vdata, and the control terminal of the data writing module 102 may be connected to the data writing control signal line S2. The data writing module 102 may be configured to provide a data signal for the driving transistor T0.

The first terminal of the compensation module 103 may be connected to the gate of the driving transistor T0, the second terminal of the compensation module 103 may be connected to the second terminal of the driving transistor T0, the control terminal of the compensation module 103 may be connected to the compensation control signal line S3. The compensation module 103 may be configured to compensate the threshold voltage deviation of the driving transistor T0.

The first terminal of the first light-emitting control module 1401 may be connected to the power supply voltage terminal PVDD, the second terminal of the first light-emitting control module 1401 may be connected to the first terminal of the driving transistor T0, and the control terminal of the first light-emitting control module 1401 may be connected to the light-emitting control signal line S41, the first terminal of the second light-emitting control module 1042 is connected to the second terminal of the driving transistor T0, the second terminal of the second light-emitting control module 1402 may be connected to the light-emitting element 200, the control terminal of the second light-emitting control module 1402 may be connected to the second light-emitting control signal line S42. The enabling stages of the first light-emitting control signal line S41 and the second light-emitting control signal line S42 may be same.

The first terminal of the holding module 105 may be connected to the power supply voltage terminal PVDD, and the second terminal of the holding module 105 may be connected to the gate of the driving transistor T0. The first terminal of the auxiliary reset module 106 may be connected to the auxiliary reset signal terminal Vref2, the second terminal of the auxiliary reset module 106 may be connected to the light-emitting element 200, and the control terminal of the auxiliary reset module 106 may be connected to the auxiliary reset control signal line S6.

Figure 6:
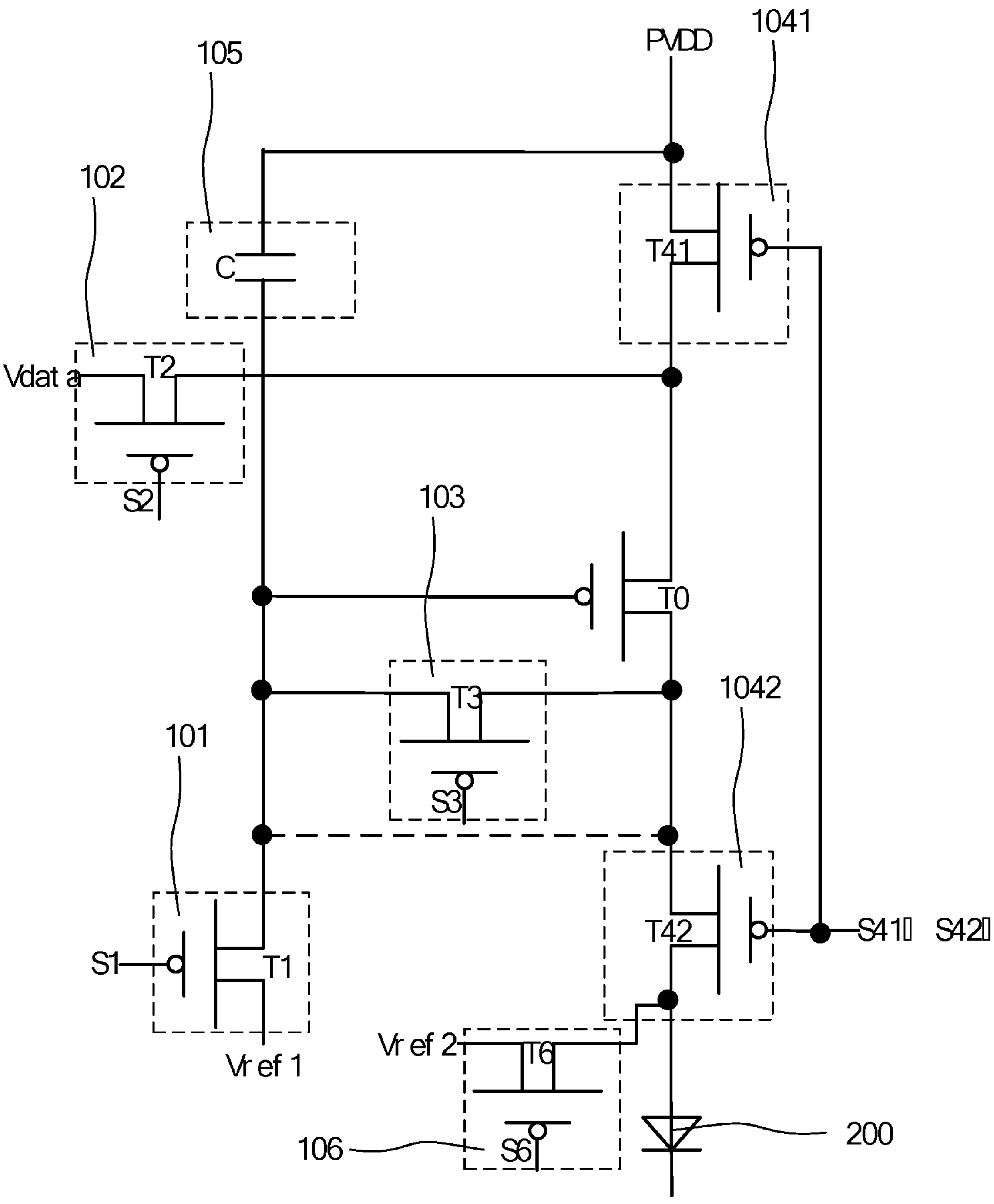
FIG. 6 illustrates another exemplary pixel circuit structure according to various disclosed embodiments of the present disclosure.

As shown in FIG. 6, the reset module 101 provided by an exemplary embodiment of the present disclosure may include a reset transistor T1. The first terminal of the reset transistor T1 may be connected to the gate of the driving transistor T0 (or the first terminal of the reset transistor T1 may be connected to the second terminal of the driving transistor T0 as shown by the dotted line in FIG. 6). The second terminal of the reset transistor T1 may be connected to the reset signal terminal Vref1, and the control terminal of the reset transistor T1 may be connected to the reset control signal line S1.

The data writing module 102 may include a data writing transistor T2. The first terminal of the data writing transistor T2 may be connected to the first terminal of the driving transistor T0, the second terminal of the data writing transistor T2 may be connected to the data signal terminal Vdata, and the control terminal of the data writing transistor T2 may be connected to the data writing control signal line S2.

The compensation module 193 may include a compensation transistor T3. The first terminal of the compensation transistor T3 may be connected to the gate of the driving transistor T0, the second terminal of the compensation transistor T3 may be connected to the second terminal of the driving transistor T0, and the control terminal of the compensation transistor T3 may be connected to the compensation control signal line S3.

The first light-emitting control module 1401 may include a first light-emitting control transistor T41. The first terminal of the first light-emitting control transistor T41 may be connected to the power supply voltage terminal PVDD, and the second terminal of the first light-emitting control transistor T41 may be connected to the first terminal of the driving transistor T0, the control terminal of the first light-emitting control transistor T41 may be connected to the first light-emitting control signal line S41. The second light-emitting control module 1042 may include a second light-emitting control transistor T42. The first terminal of the second light-emitting control transistor T42 may be connected to the second terminal of the driving transistor TO. The second terminal of the second light-emitting control transistor T42 may be connected to the light-emitting element 200, the control terminal of the second light-emitting control transistor T42 may be connected to the second light-emitting control signal line S42. The enabling stages of the first light-emitting control signal line S41 and the second light-emitting control signal line S41 may be same. In one embodiment, the conduction types of the first light-emitting control transistor T41 and the second light-emitting control transistor T42 may be same, and both may be P-type or N-type. The first light-emitting control signal line 41 and the second light-emitting control signal line 42 may be a same signal line The holding module 105 may include a holding capacitor C. The first terminal of the holding capacitor C may be connected to the power supply voltage terminal PVDD, and the second terminal of the holding capacitor C may be connected to the gate of the driving transistor TO. The auxiliary reset module 106 may include an auxiliary reset transistor T6. The first terminal of the auxiliary reset transistor T6 may be connected to the auxiliary reset signal terminal Vref2, the second terminal of the auxiliary reset transistor T6 may be connected to the light-emitting element 200, and the control terminal of the auxiliary reset transistor T6 may be connected to the auxiliary reset control signal line S6.

Figure 7:
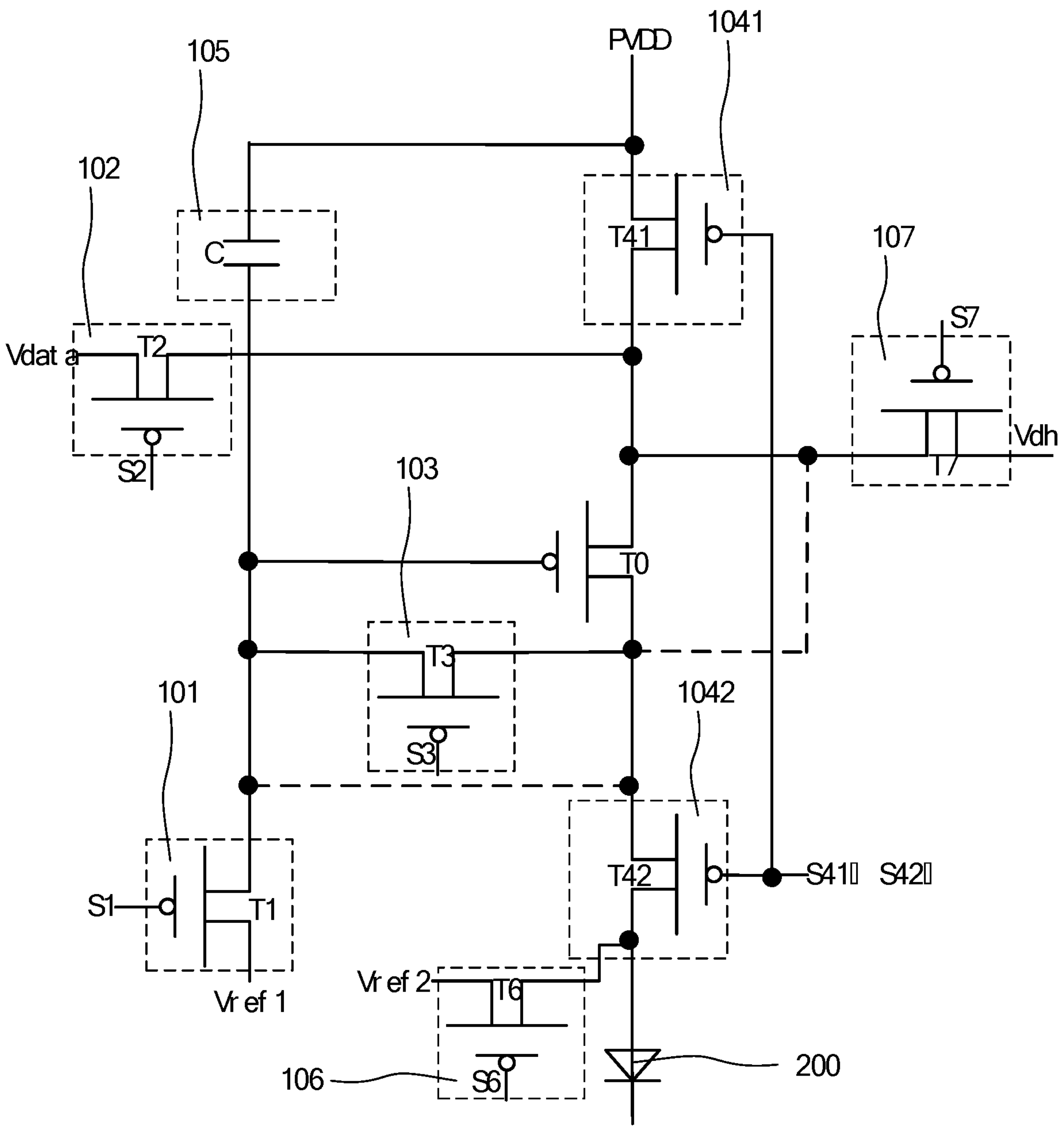
FIG. 7 illustrates another exemplary pixel circuit structure according to various disclosed embodiments of the present disclosure.

Further, to optimize the performance of the pixel circuit, a bias adjustment module may also be included in the pixel circuit. FIG. 7 is a schematic structural diagram of another exemplary pixel circuit provided by an embodiment of the present disclosure. As shown in FIG. 7, the pixel circuit may further include a bias adjustment module 107. The first terminal of the bias adjustment module 107 may be connected to the first terminal of the driving transistor TO (or the first terminal of the bias adjustment module 107 may be connected to the second terminal of the driving transistor T0 as shown as dotted line in FIG. 7). The second terminal of the bias adjustment module 107 may be connected to the bias adjustment signal terminal Vdh, and the control terminal of the bias adjustment module 107 may be connected to the bias adjustment control signal line S7.

Further, as shown in FIG. 7, the bias adjustment module 107 provided by the embodiment of the present disclosure may include a bias adjustment transistor T7. The first terminal of the bias adjustment transistor T7 may be connected to the first terminal of the driving transistor T0 (or the first terminal of the bias adjustment transistor T7 may be connected to the second terminal of the driving transistor T0 as shown in the dotted line shown in FIG. 7). The second terminal of the bias adjustment transistor T7 may be connected to the bias adjustment signal terminal Vdh, and the control terminal of the bias adjustment transistor T7 may be connected to the bias adjustment control signal line S7.

It should be noted that the pixel circuits described above in the embodiments of the present disclosure are only a few of the circuits to which the present disclosure is applicable, and the present disclosure does not specifically limit this. In addition, the transistors in the pixel circuit shown in the above figures of the present disclosure are all illustrated by taking P-type transistors as an example; in other embodiments of the present disclosure, the transistors in the pixel circuit may also be N-type transistors; or, all the transistors in the pixel circuit may also be partly P-type transistors and partly N-type transistors, which are not specifically limited in the present disclosure.

Figure 8:
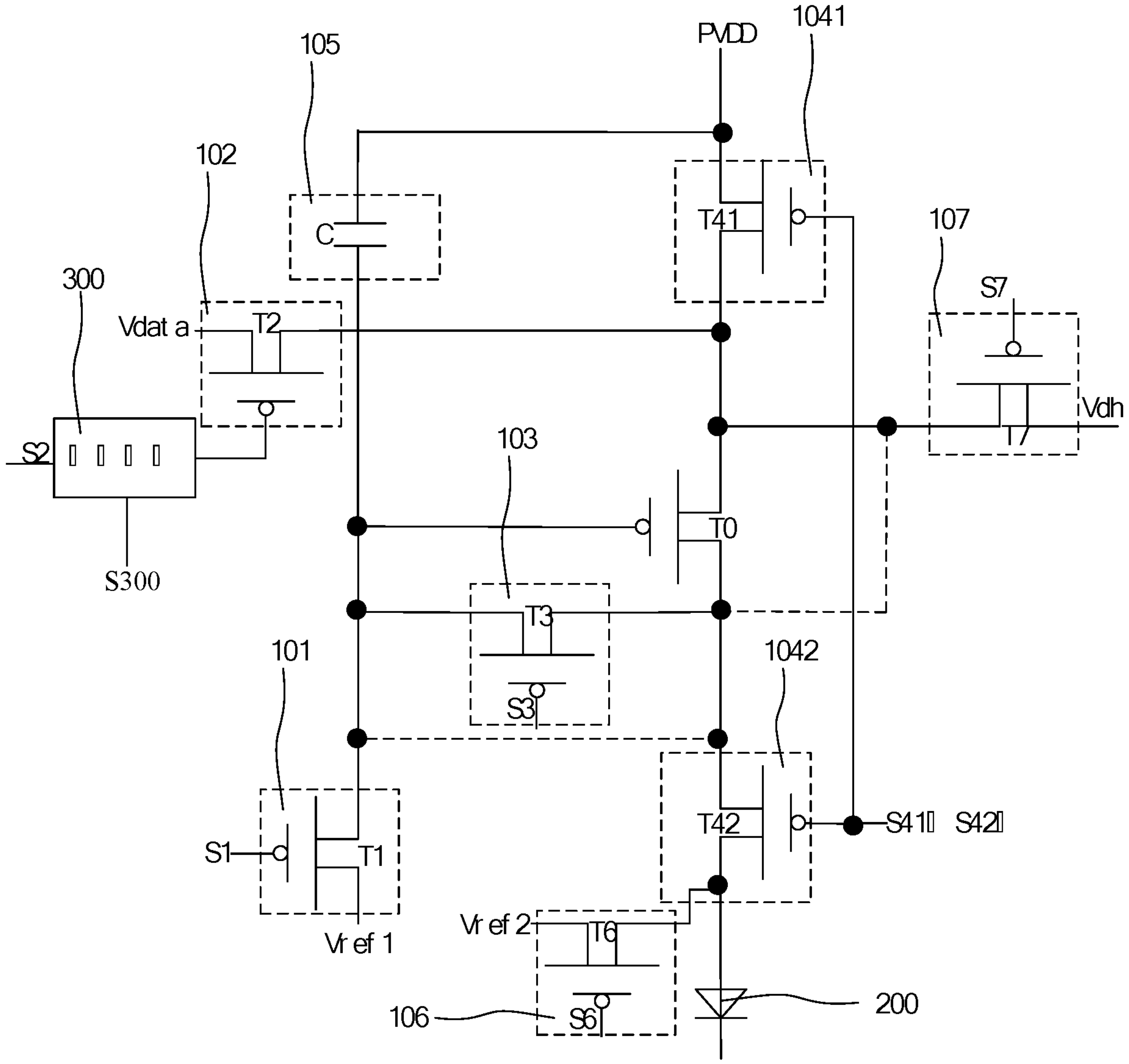
FIG. 8 illustrates another exemplary display panel according to various disclosed embodiments of the present disclosure.

FIG. 8 is a schematic structural diagram of another exemplary display panel provided by one embodiment of the present disclosure. As shown in FIG. 8, the preset module of the display panel provided by the embodiment of the present disclosure may be the data writing module 102. The first terminal of the data writing module 102 may be connected to the first terminal of the driving transistor T0. The preset signal terminal may include a data signal terminal Vdata. The second terminal of the data writing module 102 may be connected to the data signal terminal Vdata. The control signal line may include a data writing control signal line S2. The control terminal of the data writing module 102 may be connected to the data writing control signal line S2. The data writing module 102 may be configured to provide the data signal for the driving transistor T0. The gating module 300 provided in the embodiment of the present disclosure may be connected between the control terminal of the data writing module 102 and the data writing control signal line S2.

Further, as shown in FIG. 8, the gating module 300 provided by the embodiment of the present disclosure may access the control of the gating signal according to the gating signal line S300, and write data into the control signal line S2 and may be connected to the data writing transistor T2 when the gating signal is in the enabling stage. The data writing control 3 signal line S2 may be disconnected from the data writing transistor T2 when the gate signal is in the non-enable stage. Therefore, when the current frame picture of the display panel is displayed, enabling the gate signal may allow the pixel circuit to complete the process of lighting the light-emitting element 200. In the subsequent preset frame number pictures, disabling the gate signal may cause the data signal not to be transmitted to the driving transistor T0, and finally the light-emitting element 200 may keep the lighting degree unchanged when the gating signal is enabled, such that the display screen is the same from the current frame to the preset number of frames, thereby realizing the purpose of the adjustment of the screen refresh rate of the display panel.

In other embodiments of the present disclosure, when the preset module is the data writing module, the gating module may also be connected between the first terminal of the data writing module and the first terminal of the driving transistor, or the gating module may be connected between the second terminal of the data writing module and the data signal terminal, which needs to be specifically designed according to the actual application.

Figure 9:
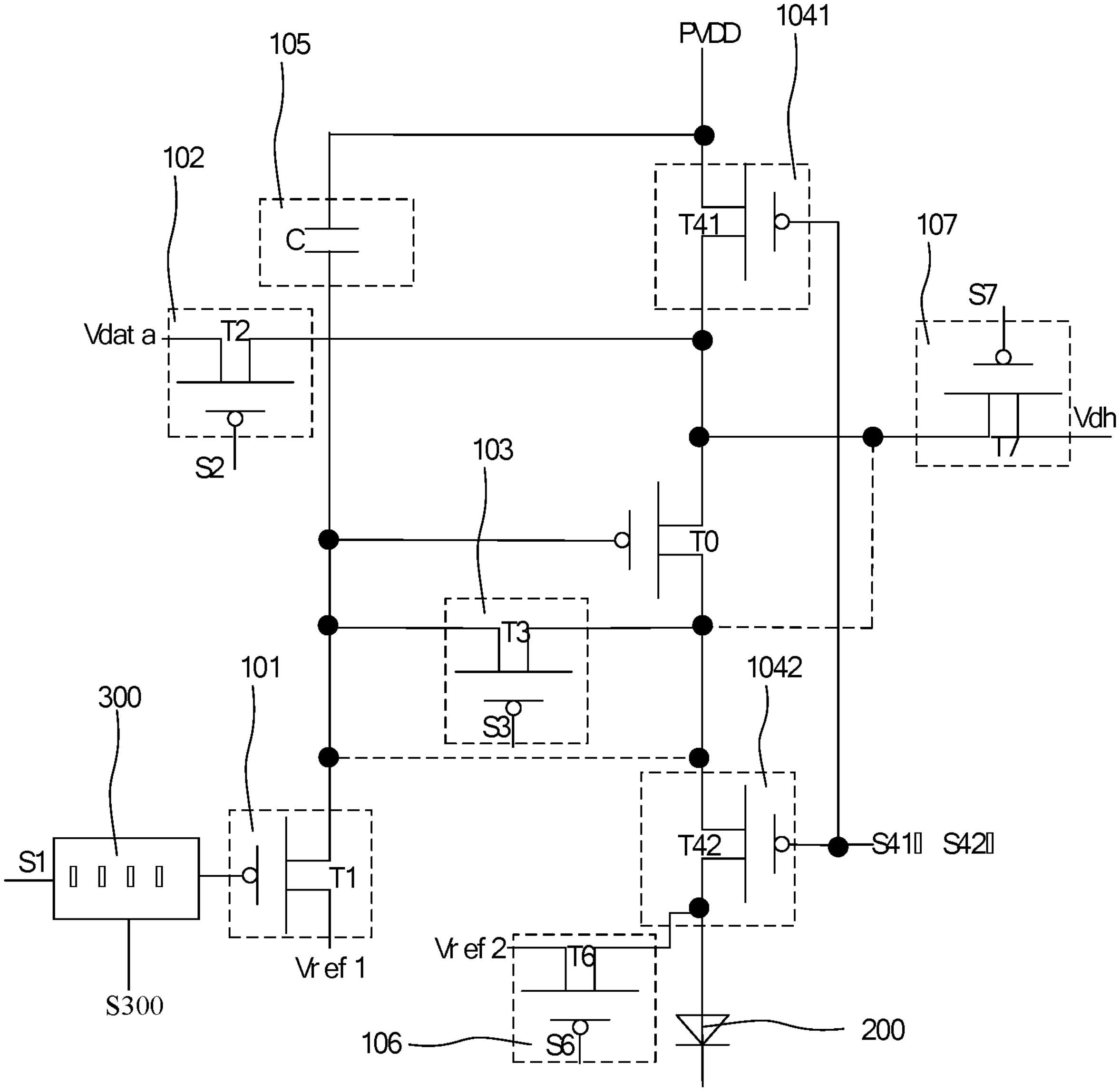
FIG. 9 illustrates another exemplary display panel according to various disclosed embodiments of the present disclosure.

FIG. 9 illustrates a schematic structural diagram of another exemplary display panel according to various disclosed embodiments of the present disclosure. As shown in FIG. 9, the preset module of the display panel provided by the embodiment of the present disclosure may be a reset module 101. The first terminal of the reset module 101 may be connected to the gate of the driving transistor T0 (or the first terminal of the reset module 101 may be connected to the second terminal of the driving transistor T0 as shown as the dotted line shown in FIG. 9). The preset signal terminal may include a reset signal terminal Vref1. The second terminal of the reset module 101 may be connected to the reset signal terminal Vref1. The control signal line may include a reset control signal line S1. The control terminal of the reset module 101 may be connected to the reset control signal line S1. The reset module 101 may be configured for providing a reset signal for the driving transistor T0. The gating module 300 provided in the embodiment of the present disclosure may be connected between the control terminal of the reset module 101 and the reset control signal line S1.

Further, as shown in FIG. 9, the gating module 300 provided by the embodiment of the present disclosure can access the control of the gating signal according to the gating signal line S300, and may connect the reset control signal line S1 with the reset transistor T1 when the gating signal is in the enabling stage, and may disconnect the reset control signal line S1 from the reset transistor T1 when the gating signal is in the non-enable stage. Therefore, when the current frame picture of the display panel is displayed, the gating signal may be enabled to allow the pixel circuit to normally complete the process of lighting the light-emitting element 200. In the subsequent preset frame number pictures, the gating signal may be disabled such that the reset signal may not be transmitted to the driving transistor T0, and finally the light-emitting element 200 may be kept the lighting degree unchanged when the gating signal is enabled. Accordingly, the displayed screen of the display panel from the current frame to the preset number of frames may be same, thereby realizing the purpose of adjusting the screen refresh rate of the display panel.

In other embodiments of the present disclosure, when the preset module is the reset module, the gating module may also be connected between the first terminal of the reset module and the gate of the driving transistor, or the gating module may also be connected between the first terminal of the reset module and the second terminal of the driving transistor, or the gating module may be connected between the second terminal of the reset module and the reset signal terminal. The connection manner of the gating module may be specifically designed according to the actual application.

Figure 10:
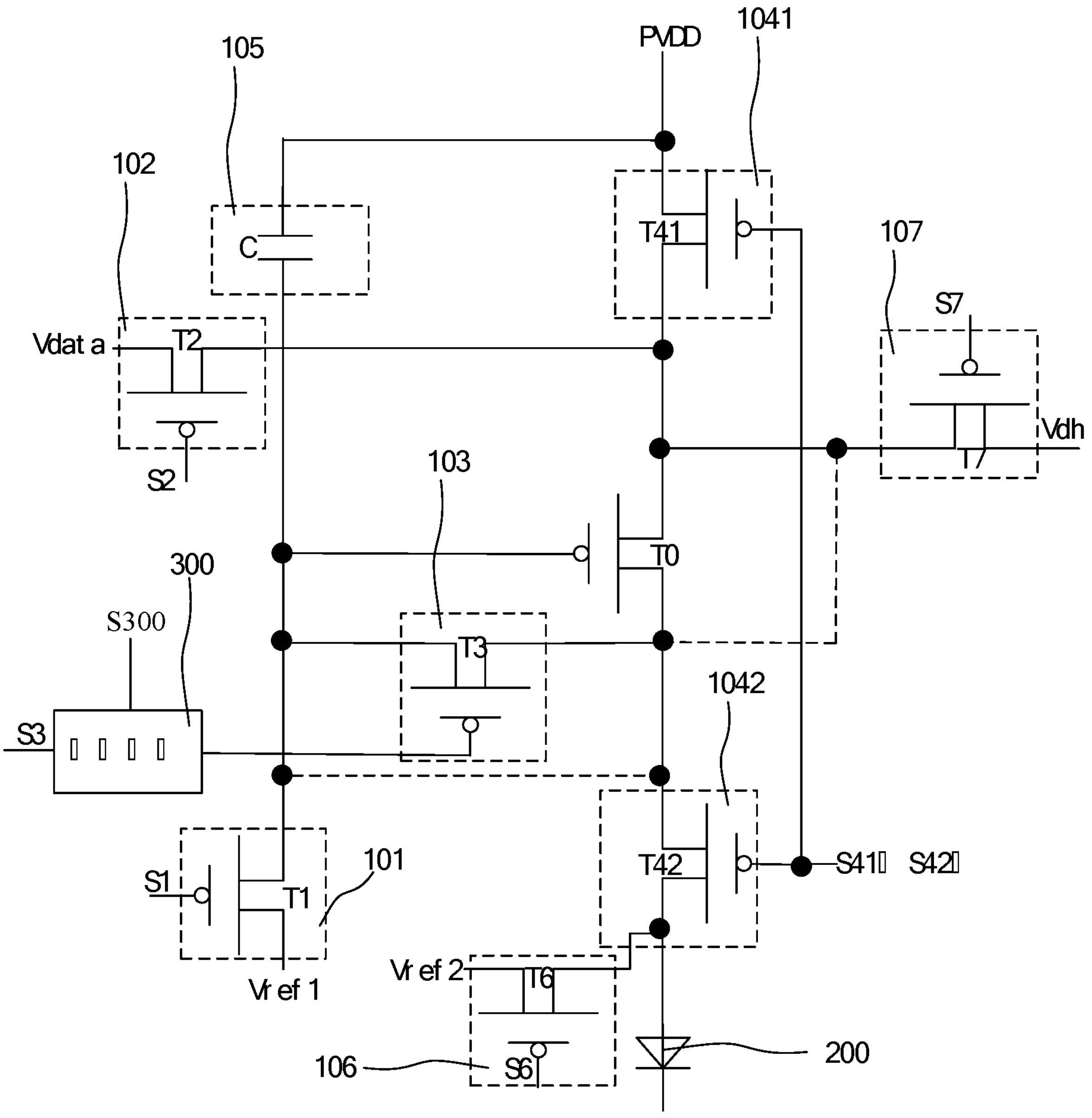
FIG. 10 illustrates another exemplary display panel according to various disclosed embodiments of the present disclosure.

FIG. 10 illustrates a schematic structural diagram of another exemplary display panel provided by an embodiment of the present disclosure. As shown in FIG. 10, the preset module provided by the embodiment of the present disclosure may be a compensation module 103. The first terminal of the compensation module 103 may be connected to the gate of the driving transistor T0. The second terminal of the compensation module 103 may be connected to the second terminal of the driving transistor T0. The control signal line may include a compensation control signal line S3. The gate of the compensation module 103 may be connected to the compensation control signal line S3. The compensation module 103 may be configured to compensate the threshold voltage deviation of the driving transistor T0. The gating module 300 provided in the embodiment of the present disclosure may be connected between the control terminal of the compensation module 103 and the compensation control signal line S3.

As shown in FIG. 10, the gating module 300 provided by the embodiment of the present disclosure may access the control of the gating signal according to the gating signal line S300, and connect the compensation control signal line S3 with the compensation transistor T3 when the gating signal is in the enabling stage, and disconnected the compensation control signal line S3 from the compensation transistor T3 when the gating signal is in the non-enable stage. Therefore, when the current frame picture of the display panel is displayed, the gating signal may be enabled such that the pixel circuit may normally complete the process of lighting the light-emitting element 200; and in the subsequent preset frame number pictures, the gating signal may be disabled such that the gate of the driving transistor T0 and its second terminal may not be communicated. Accordingly, the light-emitting element 200 may keep the lighting degree unchanged when the gating signal is enabled such that the display panel may have the same picture from the current frame to the preset number of frames. Thus, the purpose of adjusting the screen refresh frequency of the display panel may be achieved.

In other embodiments of the present disclosure, when the preset module is the compensation module, the gating module may also be connected between the first terminal of the compensation module and the gate of the driving transistor, or the gating module may also be connected to the compensation module between the second terminal of the compensation module and the second terminal of the driving transistor. The connection manner of the gating module may be specifically designed according to the actual application.

Figure 11:
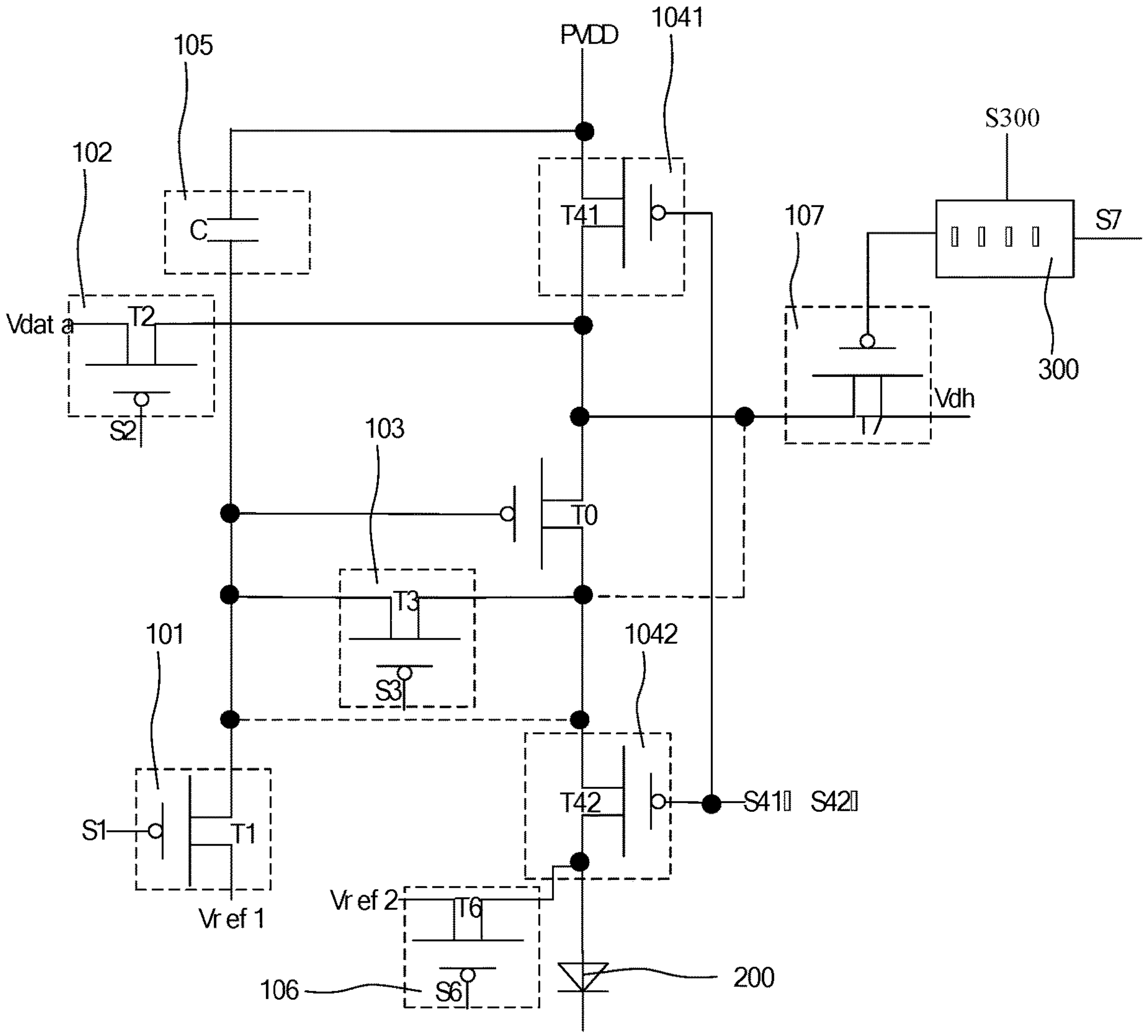
FIG. 11 illustrates another exemplary display panel according to various disclosed embodiments of the present disclosure.

FIG. 11 is a schematic structural diagram of another exemplary display panel provided by an embodiment of the present disclosure. As shown in FIG. 11, the preset module provided by the embodiment of the present disclosure may be a bias adjustment module 107. The first terminal of the bias adjustment module 107 may be connected to the first terminal of the driving transistor T0 (or as shown as the dotted line in FIG. 11, the first terminal of the bias adjustment module 107 may be connected to the second terminal of the driving transistor T0). The preset signal terminal may include a bias adjustment signal terminal Vdh. The second terminal of the bias adjustment module 107 may be connected to the bias adjustment signal terminal Vdh. The control signal line may include a bias adjustment control signal line S7, and the control terminal of the bias adjustment module 107 may be connected to the bias adjustment control signal line S7. The bias adjustment module 107 may be configured to provide a bias adjustment signal for the driving transistor T0. The gating module 300 provided in the embodiment of the present disclosure may be connected between the control terminal of the bias adjustment module 107 and the bias adjustment control signal line S7.

Referring to FIG. 11, the gating module 300 provided by the embodiment of the present disclosure may access the control of the gating signal according to the gating signal line S300. When the gating signal is in the enabling stage, the bias adjustment control signal line S7 may be connected to the bias control signal line S7. When the gating signal is in the non-enable stage, the bias adjustment control signal line S7 and the bias adjustment transistor T7 may be disconnected. Therefore, when the current frame picture of the display panel is displayed, the gating signal may be enabled such that the pixel circuit may normally complete the process of lighting the light-emitting element 200. In the subsequent preset frame number of pictures, the gating signal may be disabled such that the bias adjustment signal may not be transmitted to the driving transistor T0, and finally the light-emitting element 200 may keep the lighting degree unchanged when the gating signal is enabled. Accordingly, the display panel may have a same picture from the current frame to the preset number of frames, and the purpose of adjust the screen refresh rate of the display panel may be achieved.

In other embodiments of the present disclosure, when the preset module is the bias adjustment module, the gating module may also be connected between the first terminal of the bias adjustment module and the first terminal of the driving transistor, or the gating module may also be connected between the first terminal of the bias adjustment module and the second terminal of the driving transistor, or the gating module may also be connected between the second terminal of the bias adjustment module and the bias adjustment signal terminal. The specific design of the gating module may be carried out according to the actual application.

In one embodiment of the present disclosure, in at least a portion of the operation process of the display panel provided by the present disclosure, the pulse change frequency of the gating signal may be F, and the pulse change frequency of the control signal may be Fc, and F/Fc. Therefore, on the basis of keeping the pulse change frequency of the control signal Fc unchanged, by changing the pulse change frequency F of the gating signal, the lighting state of the light-emitting element of the pixel circuit connected with the gating module may be changed to achieve the purpose of the screen refresh frequency of the display panel. For example, under the condition of the pulse change frequency F, the gating signal of the current frame of the display panel may be set in the enabling stage such that the pixel circuit may control the light-emitting element to light normally, and display the screen at the corresponding pixel point. Then, in the time period of the subsequent preset number of frames of the display panel, the gating signal may be set to be disabled such that the preset module may transmit the relevant signal to the driving transistor such that the display screen of the pixel point from the current frame to the preset frame number of frames may be same. Accordingly, the purpose of adjusting the screen refresh frequency of the display panel may be achieved. In one embodiment, $F<Fc$, the duration of the enable stage of the gating signal may be shorter than the duration of the disabled stage.

Figure 12:
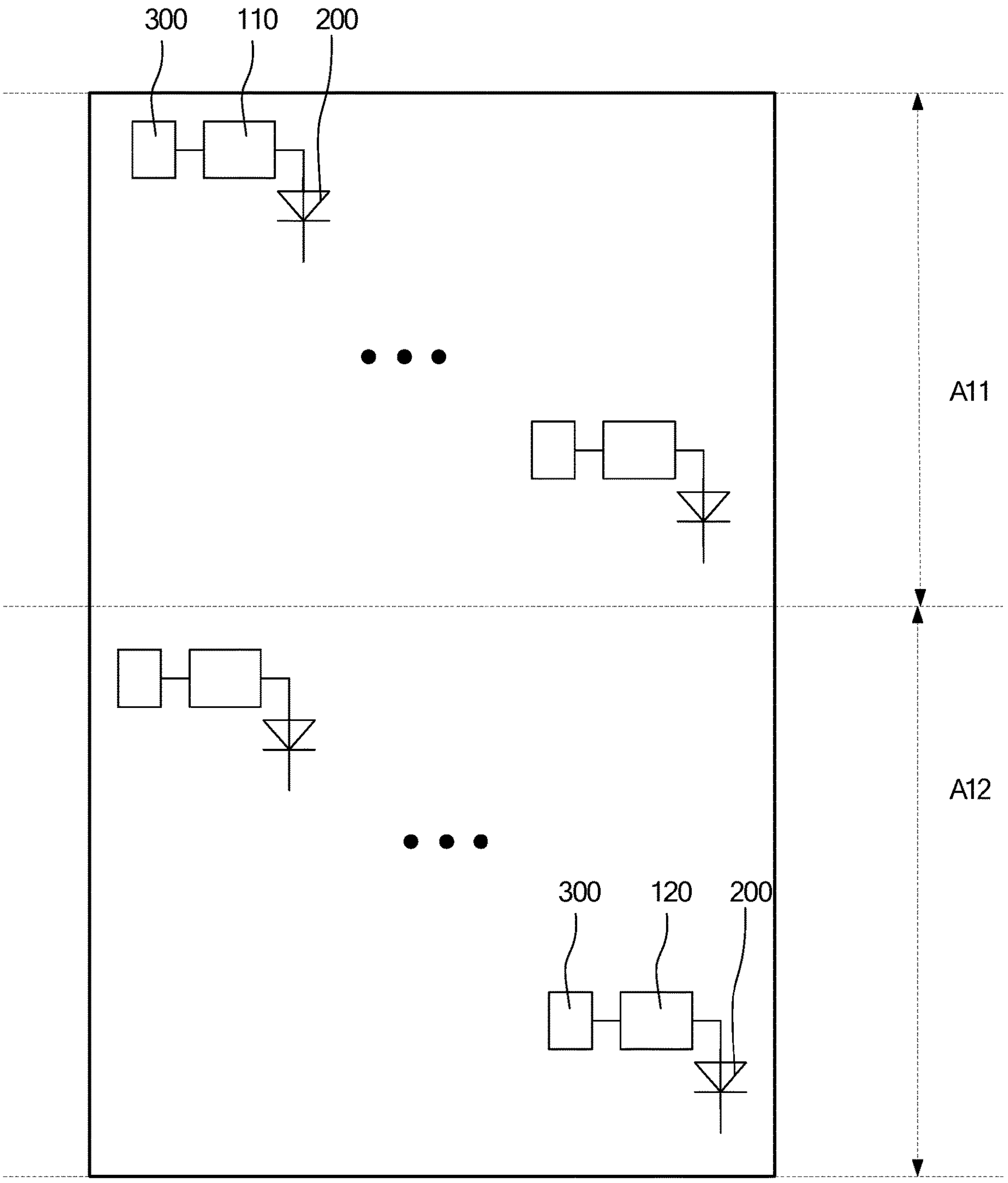
FIG. 12 illustrates another exemplary display panel according to various disclosed embodiments of the present disclosure.

FIG. 12 is a schematic structural diagram of another exemplary display panel provided by an embodiment of the present disclosure. As shown in FIG. 12, the display panel provided by an embodiment of the present disclosure may include a first display area A11 and a second display area A12. The pixel circuit may include a first pixel circuit 110 and a second pixel circuit 120. The first pixel circuit 110 may be connected to the light-emitting element 200 in the first display area A11, and the second pixel circuit 120 may be connected to the second pixel circuit 120 in the second display area A12. The light-emitting elements 200 of the display area A12 may be connected each other.

It should be noted that the first display area A11 and the second display area A12 provided in the embodiment of the present disclosure may be two areas arranged along a first direction, or the first display area 11 and the second display area A12 may be two regions arranged along a second direction. The first direction may be the arrangement direction of multiple pixel circuit rows, and the second direction may the extension direction of the pixel circuits in a single pixel circuit row. The arrangement of the first direction and the second direction is not specifically limited in the present disclosure.

As shown in FIG. 12, both the first pixel circuit 110 and the second pixel circuit 120 provided in this embodiment of the present disclosure may be connected to a gating module 300. In at least a portion of the operation process of the display panel, the pulse change frequency of the gating signal received by the gating module 300 connected to the first pixel circuit 110 may be F1, and the pulse change frequency of the gating signal received by the gating module 300 connected to the second pixel circuit 120 may be F2, and F1≠F2. Therefore, in at least a portion of the operation process of the display panel, it may be possible to realize the adjustment of the different screen refresh frequencies of the first display area A11 and the second display area A12. For example, the display area of the display panel corresponding to the higher frequency of F1 and F2 may be configured to display high-frequency images (such as high-frequency dynamic images), and the display area corresponding to the lower frequency of F1 and F2 may be configured to display low-frequency images (such as low-frequency static images). Such a configuration may satisfy that the different display areas of the display panel may display with different frequencies. At the same time, the power consumption of the display panel may also be reduced.

In one embodiment, the data refresh frequency of the first pixel circuit provided in the embodiment of the present disclosure is greater than the data refresh frequency of the second pixel circuit; and F1>F2. The data refresh frequency is the frequency at which the pixel circuit successfully writes the data signal into the driving transistor and makes the driving transistor generate the driving current to the light-emitting element according to the data signal, that is, the data refresh frequency and at least one of the display refresh frequency and the pulse change of the strobe signal may be positively correlated. A larger data refresh frequency may correspond to a larger pulse change frequency of the gating signal, otherwise, a smaller data refresh frequency may correspond to a smaller pulse change frequency of the gating signal.

Figure 13:
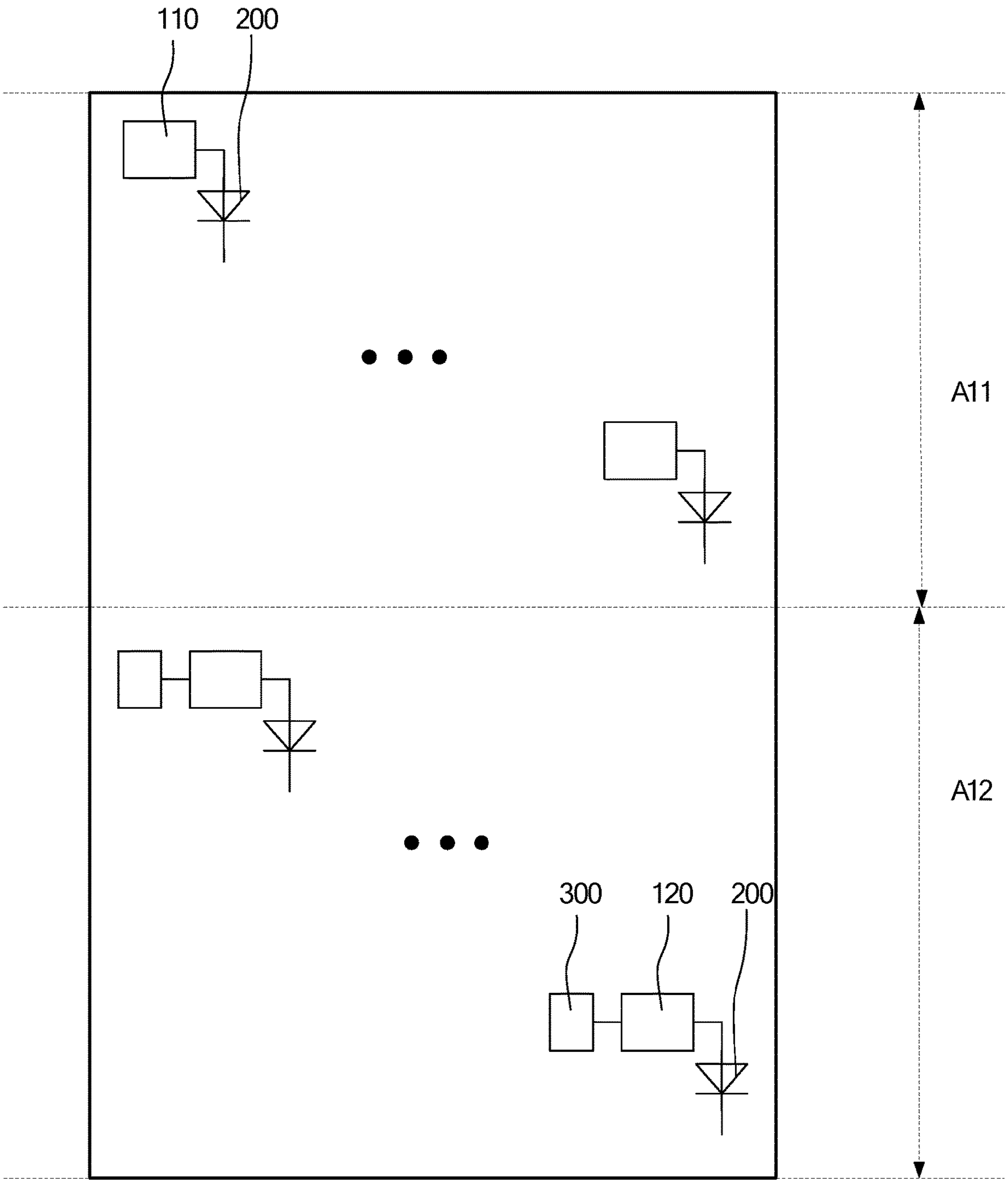
FIG. 13 illustrates another exemplary display panel according to various disclosed embodiments of the present disclosure.

FIG. 13 is a schematic structural diagram of another exemplary display panel provided by an embodiment of the present disclosure. As shown in FIG. 13, the display panel provided by an embodiment of the present disclosure may include a first display area A11 and a second display area A12. The pixel circuit of the display panel may include a first pixel circuit 110 and a second pixel circuit 120. The first pixel circuit 110 may be connected to the light-emitting element 200 in the first display area A11, and the second pixel circuit 120 may be connected to the light-emitting element 200 in the second display area A12. One of the first pixel circuit 110 and the second pixel circuit 120 may not include a gating module, and the other one may include the gating module 300. For example, one of the first pixel circuit 110 and the second pixel circuit 120 may be connected to the gating module 300, while the other may not be connected to the gating module 300.

It can be understood that in the first display area A11 and the second display area A12, the screen refresh frequency of the display area corresponding to the pixel circuit connected with the gating module 300 may be positively correlated with the pulse change frequency of the gating signal. The screen refresh frequency of the display area corresponding to the pixel circuit that is not connected to the gating module may be positively correlated with the data refresh frequency of the pixel circuit. Therefore, by optimizing the design of the pulse change frequency of the gating signal, the screen refresh rates of the first display area A11 and the second display area A12 may be adjusted differently.

As shown in FIG. 13, the data refresh frequency of the first pixel circuit 110 provided by the embodiment of the present disclosure may be greater than the data refresh frequency of the second pixel circuit 120. The first pixel circuit 110 may not include the gating module 300, and the second pixel circuit 120 may include the gating module 300.

In FIGS. 14-21, the related technology in which the gating module 300 is connected between the control terminal d of the preset module 10*x* and the control signal line Sx will be described in detail.

Figure 14:
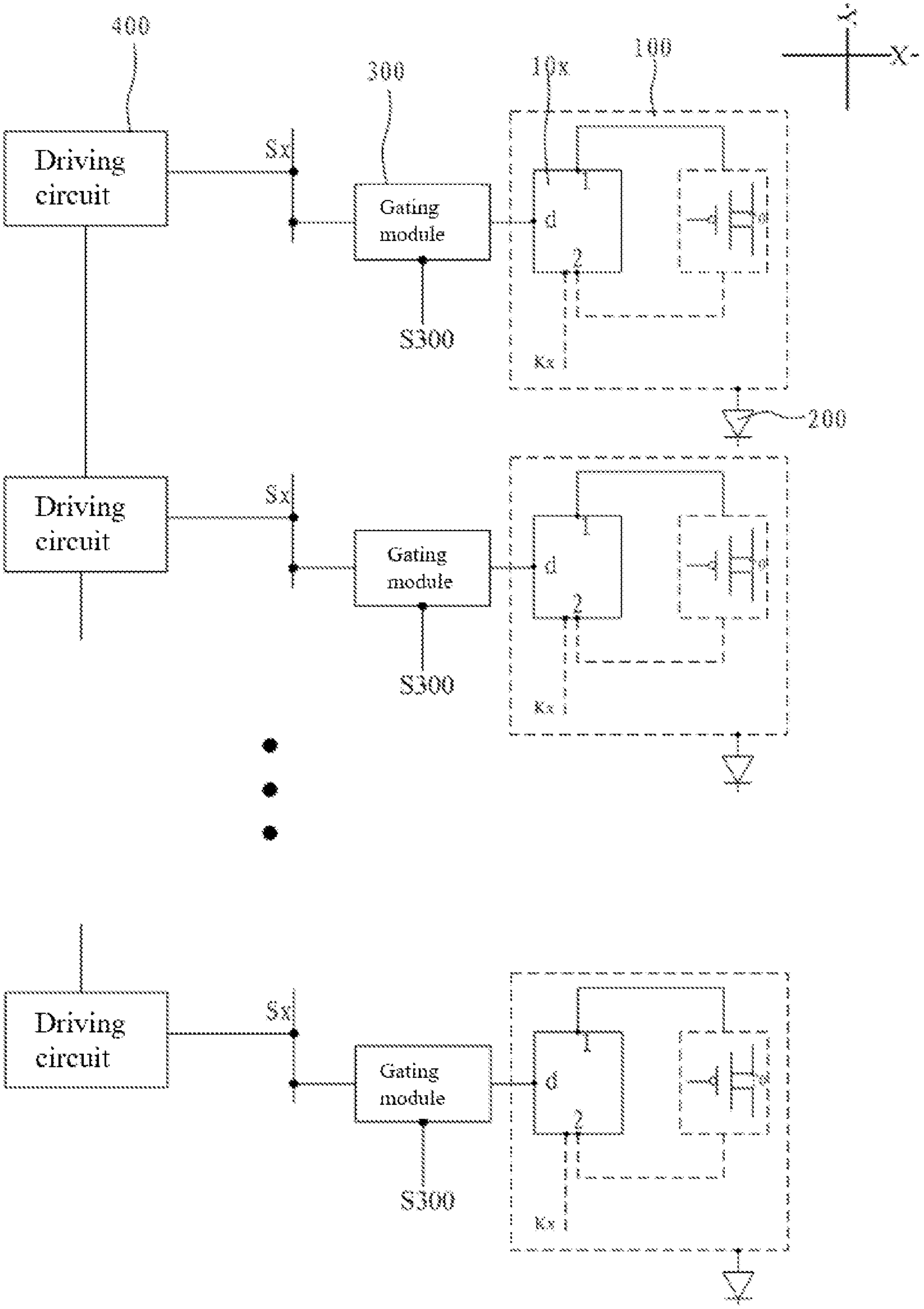
FIG. 14 illustrates another exemplary display panel according to various disclosed embodiments of the present disclosure.

FIG. 14 is a schematic structural diagram of another exemplary display panel provided by an embodiment of the present disclosure. As shown in FIG. 14, the gating module 300 of the display panel provided by the embodiment of the present disclosure may be connected between the control terminal d of the preset module 10*x* and the control signal lines Sx. The display panel may further include a driving circuit 400, and the driving circuit 400 may be configured to provide the control signal for the control signal line Sx. The control signal required for the operation of the pixel circuit 100 provided by the embodiment of the present disclosure may be generated by the driving circuit 400. The display panel may include a plurality of cascaded driving circuits 400, and the cascaded driving circuits 400 may be arranged along a first direction Y. The first direction Y may be the arrangement direction of the multi-row pixel circuits, and the second direction X may be the extension direction of the pixel circuits in a single row.

Figure 15:
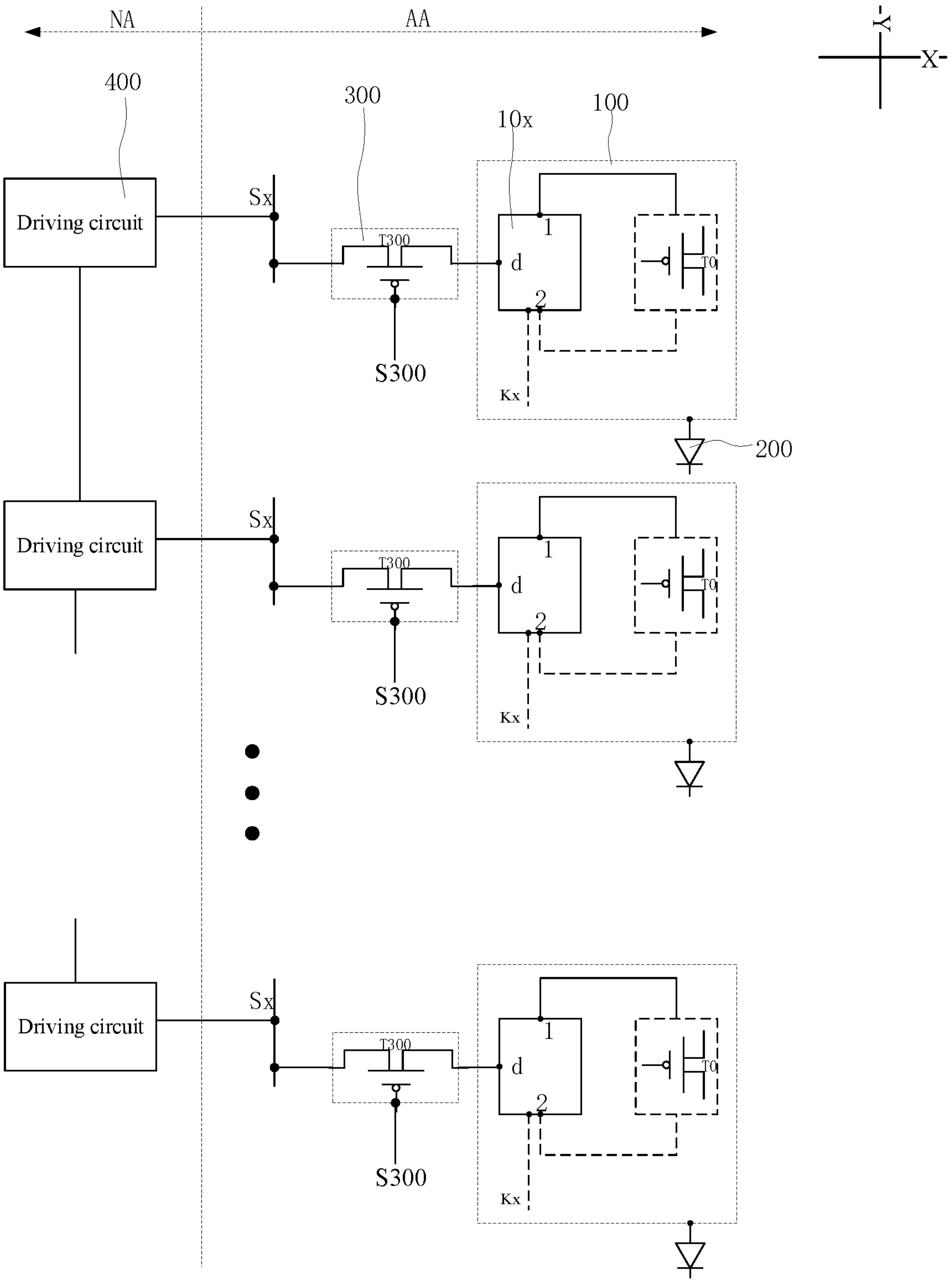
FIG. 15 illustrates another exemplary display panel according to various disclosed embodiments of the present disclosure.

FIG. 15 is a schematic structural diagram of another exemplary display panel provided by an embodiment of the present disclosure. As shown in FIG. 15, the display panel provided by an embodiment of the present disclosure may include a display area AA and a frame area NA. At least one of the driving circuit 400, the gating module 300 and the gate signal line S300 may be located in the frame NA area. The gating module 300 may be located at a side of the driving circuit 400 facing the display area AA. The gating module 300 may include a number N of gating transistors T300, and N>1. The gate signal line S300 may be connected to the gate of the gating transistor T300.

It can be understood that the gating module 300 provided in this embodiment of the present disclosure may be implemented by the gating transistors T300. When the gating module 300 includes a gating transistor T300, the first terminal of the gating transistor T300 may be connected to the control signal line Sx, the second terminal of the gating transistor T300 may be connected to the control terminal d of the preset module 10*x*, and the gate of the gating transistor T300 may be connected to the gate signal line S300. In some embodiments, when the gating module 300 includes multiple gating transistors T300, the multiple gating transistors T300 may be connected in series and/or in parallel to form a switch controlled by a gating signal to realize the function of the gating module 300.

Figure 16:
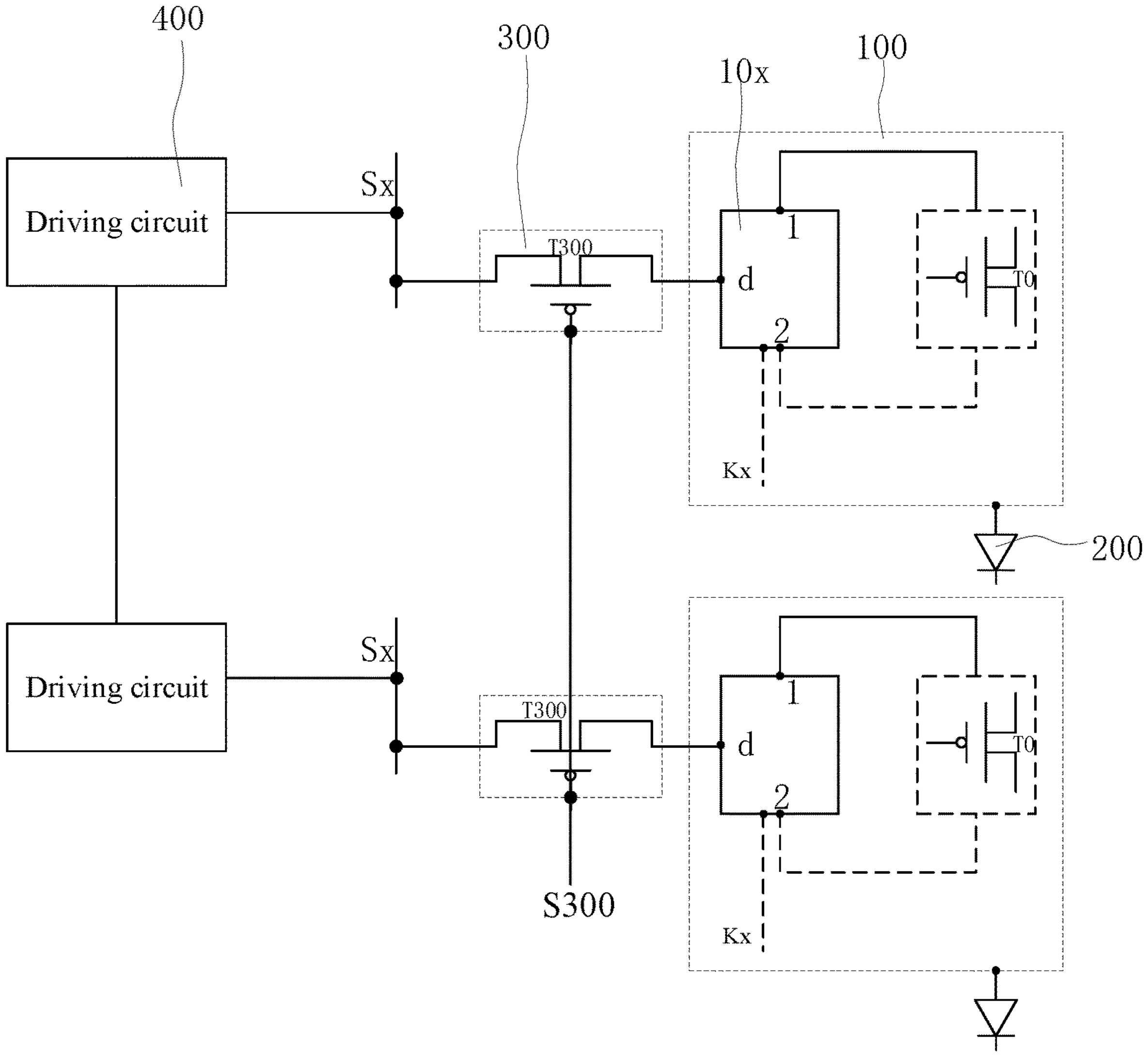
FIG. 16 illustrates another exemplary display panel according to various disclosed embodiments of the present disclosure.

FIG. 16 is a schematic structural diagram of another exemplary display panel provided by an embodiment of the present disclosure. As shown in FIG. 16, the conduction types of the gating transistors T300 of different gating modules 300 provided by the embodiment of the present disclosure may be same. The gate transistors T300 may all be N-type transistors, or may all be P-type transistors. The gates of all the gating transistors T300 provided by the embodiments of the present disclosure may be connected to the same gate signal line S300. Such a configuration may reduce wiring terminals and expand the effective wiring space of the display panel.

Figure 17:
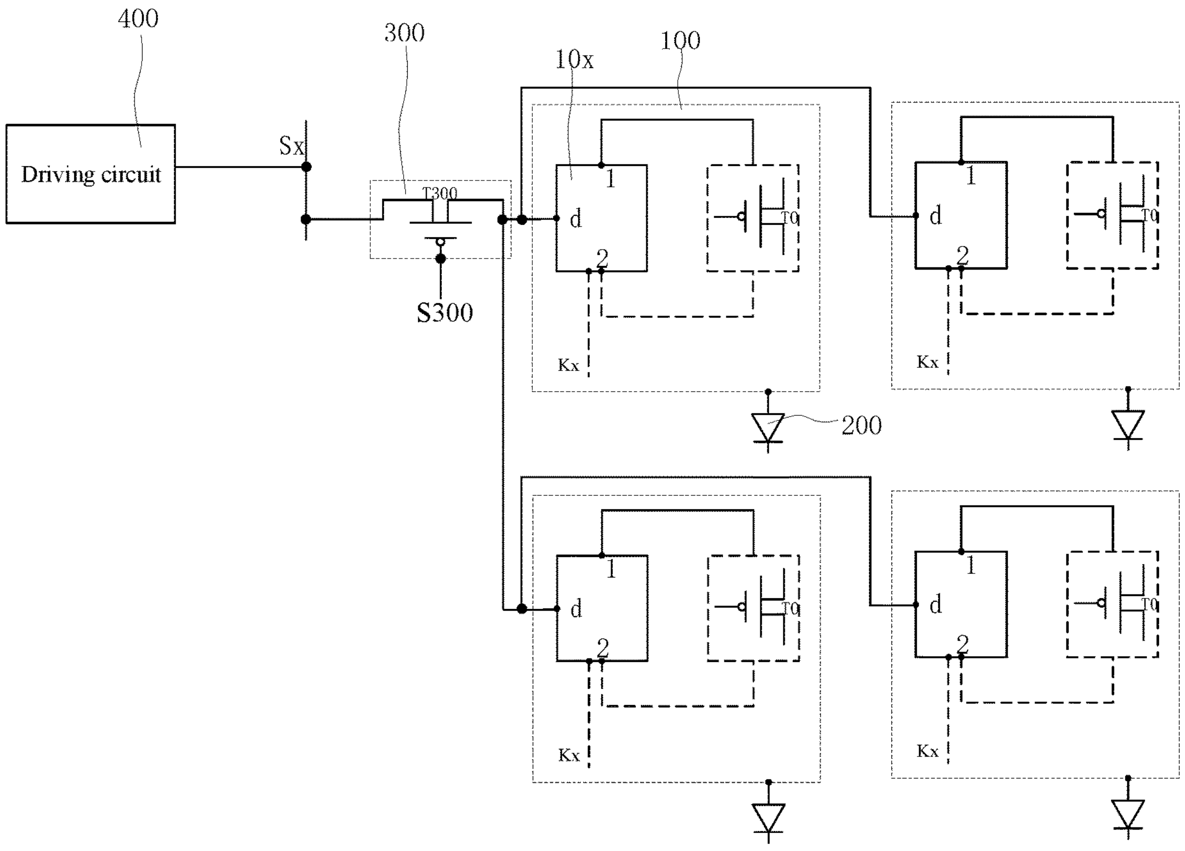
FIG. 17 illustrates another exemplary display panel according to various disclosed embodiments of the present disclosure.

FIG. 17 is a schematic structural diagram of another exemplary display panel provided by an embodiment of the present disclosure. As shown in FIG. 17, a number P rows of pixel circuits 100 of the display panel provided by the embodiment of the present disclosure may be connected to the same gating module 300, and P 1. The driving circuit 400 provided in this embodiment of the present disclosure may drive at least one row of pixel circuits 100. When the driving circuit 400 drives a single row of pixel circuits 100, the pixel circuits 100 in the row may all be connected to the same gating module 300. When the driving circuit 400 drive multiple rows of pixel circuits 100 at the same time (taking two rows of pixel circuits 100 as an example in FIG. 17), the multiple rows of pixel circuits 100 may all be connected to the same gating module 300. Accordingly, the number of gating modules 300 may be reduced; and ensuring that the wiring space of the display panel may be relatively large.

Figure 18:
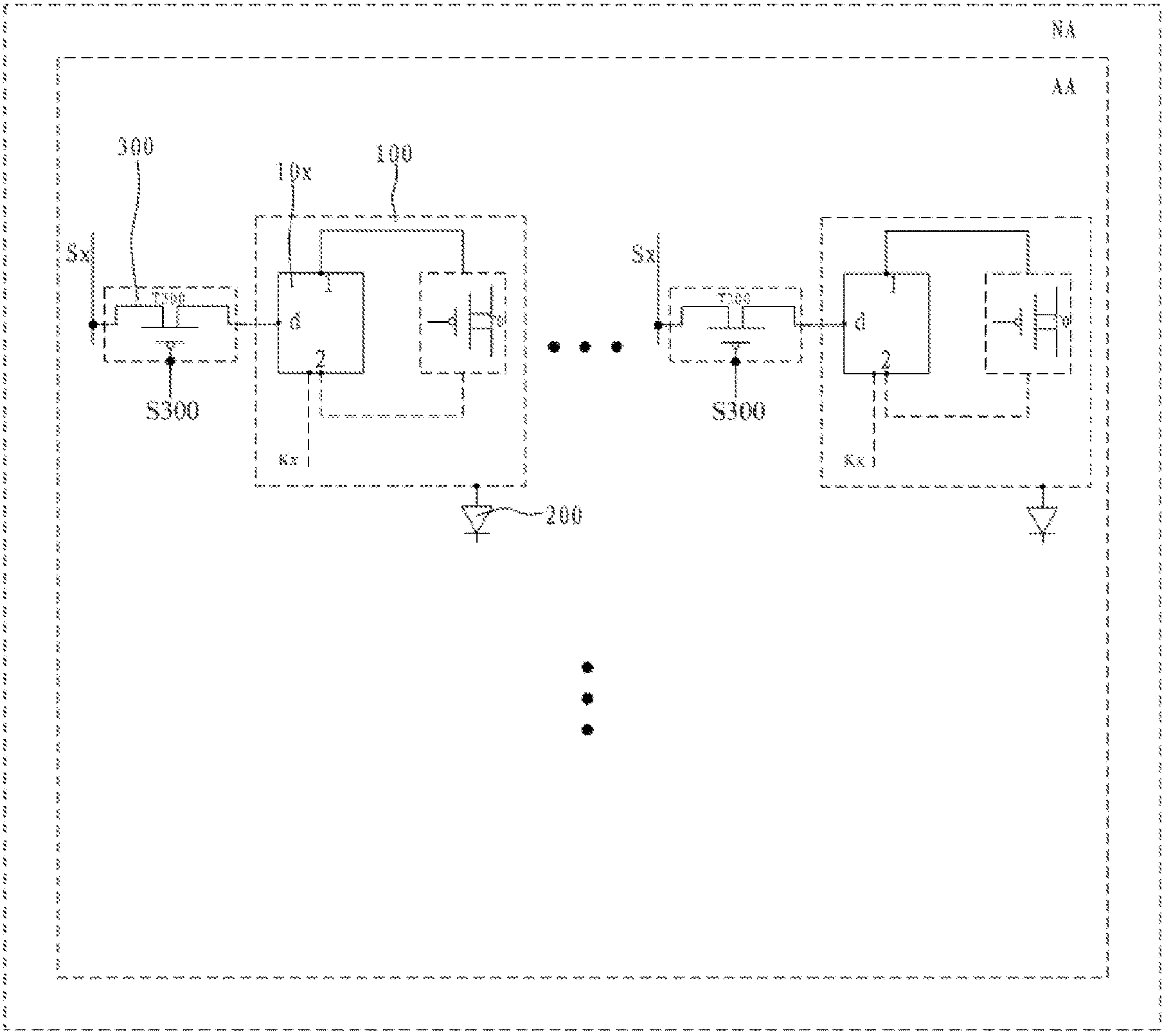
FIG. 18 illustrates another exemplary display panel according to various disclosed embodiments of the present disclosure.

FIG. 18 is a schematic structural diagram of another exemplary display panel provided by an embodiment of the present disclosure. As shown in FIG. 18, the display panel provided by an embodiment of the present disclosure may include a display area AA and a frame area NA. The gating module 300 may be located in the display area AA. One of the pixel circuits 100 may include at least one gating module 300. It can be understood that when the gating module 300 provided in the embodiment of the present disclosure is disposed in the display area, any one of the pixel circuits 100 whose data refresh frequency needs to be changed may be connected to at least one gating module 300. In one embodiment, the conduction types of the gating transistors T300 in different gating modules 300 may be same, and the gates of the gating transistors T300 in different gate modules 300 may be connected to the same gating signal line S300.

Figure 19:
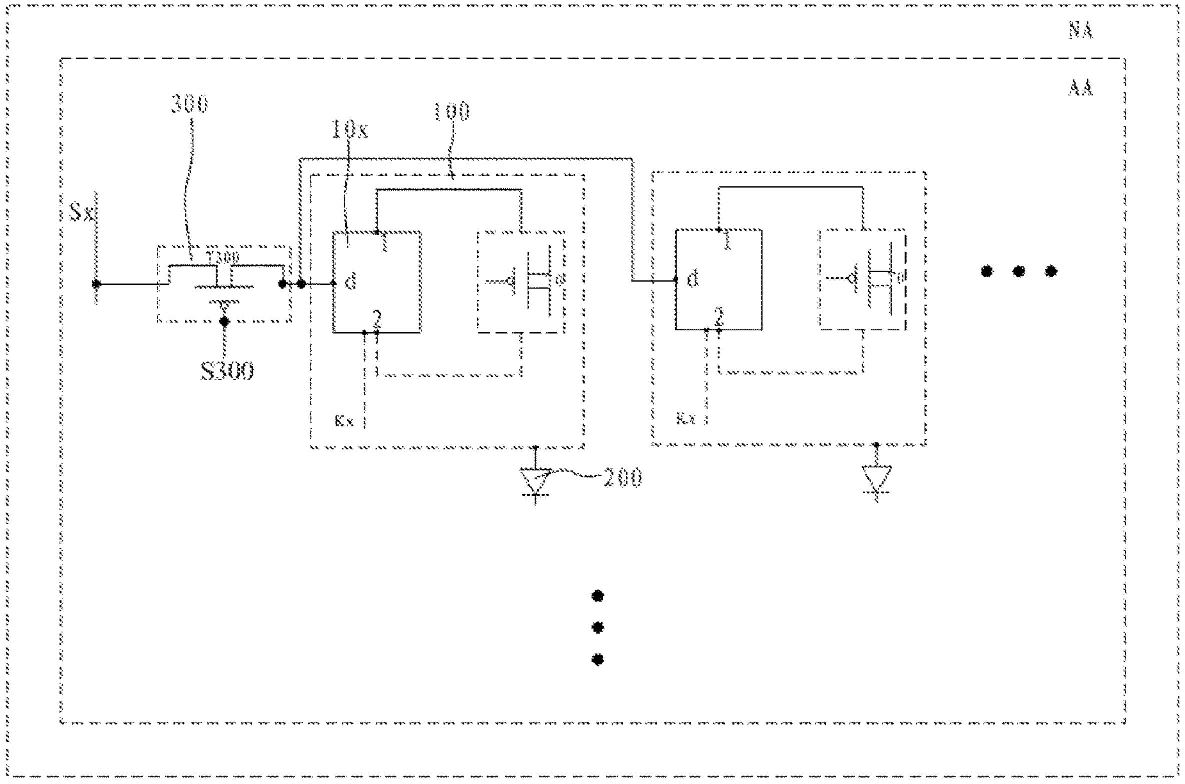
FIG. 19 illustrates another exemplary display panel according to various disclosed embodiments of the present disclosure.

FIG. 19 is a schematic structural diagram of another exemplary display panel provided by an embodiment of the present disclosure. The display panel provided by an embodiment of the present disclosure may include a display area AA and a frame area NA. The gating module 300 may be located in the display area AA. A number T of pixel circuits 100 may be connected to a same gating module 300, and T By connecting multiple pixel circuits 100 to the same gating module 300, not only a relatively large wiring space of the display panel may be ensured, but also the influence of too many gating modules 300 on the pixel aperture ratio of the display panel may be reduced.

Figure 20:
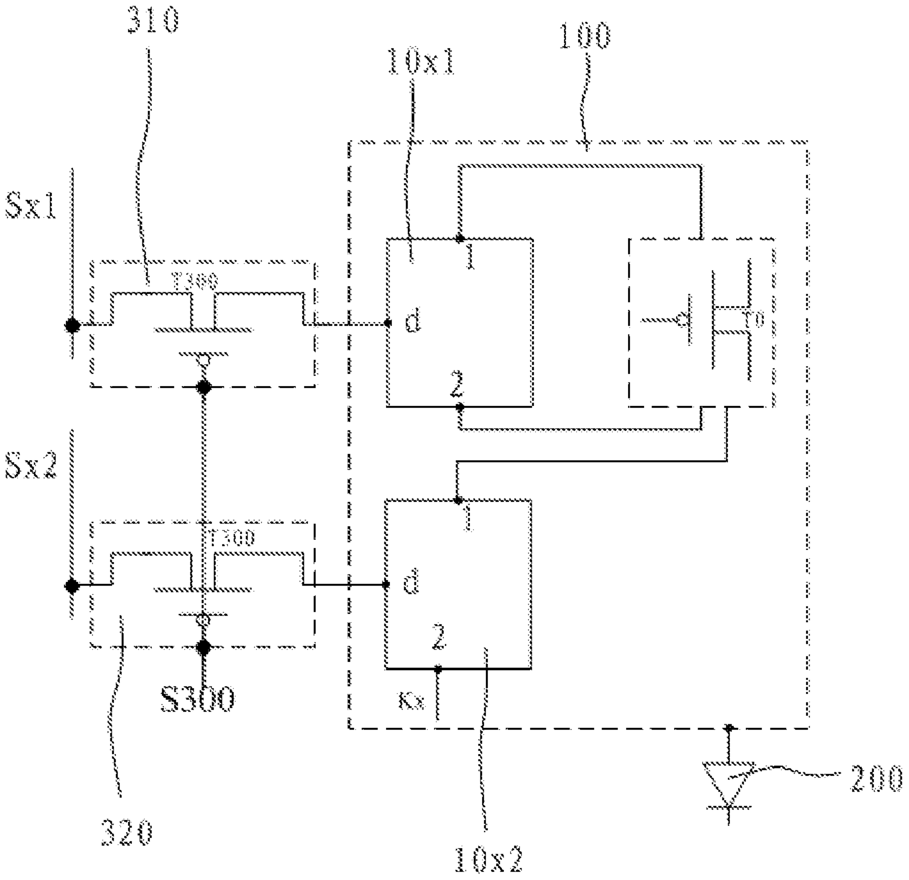
FIG. 20 illustrates another exemplary display panel according to various disclosed embodiments of the present disclosure.

FIG. 20 is a schematic structural diagram of another exemplary display panel provided by an embodiment of the present disclosure. As shown in FIG. 20, the preset module of the display panel provided by the embodiment of the present disclosure may include a first preset module 10*x*1 and a second preset module 10*x*2. At least one terminal of the first preset module 10*x*1 and at least one terminal of the second preset module 10*x*2 may be connected to different nodes. The gating module may include a first gating module 310 and a second gating module 320. The control signal line may include a first control signal line Sx1 and a second control signal line Sx2. The control terminal d of the first preset module 10*x*1 may be connected to the first gating module 310, and may be connected to the first control signal line Sx1. The control terminal d of the second preset module 10*x*2 may be connected to the second gating module 320, and may be connected to the second control signal line Sx2.

In one embodiment of the present disclosure, the control terminal of the first gating module 310 provided by the present disclosure and the control terminal of the second gating module 320 may receive a same gating signal. When the conduction type of the gating transistor T300 included in the first gating module 310 and the gating transistor T300 included the second gate module 320 are same, the control terminal of the first gating module 310 and the control terminal of the gating transistor of the second gating module 320 may be connected to the same gating signal line S300. Such a configuration may reduce wiring terminals and may ensure a relatively large wiring space.

Figure 21:
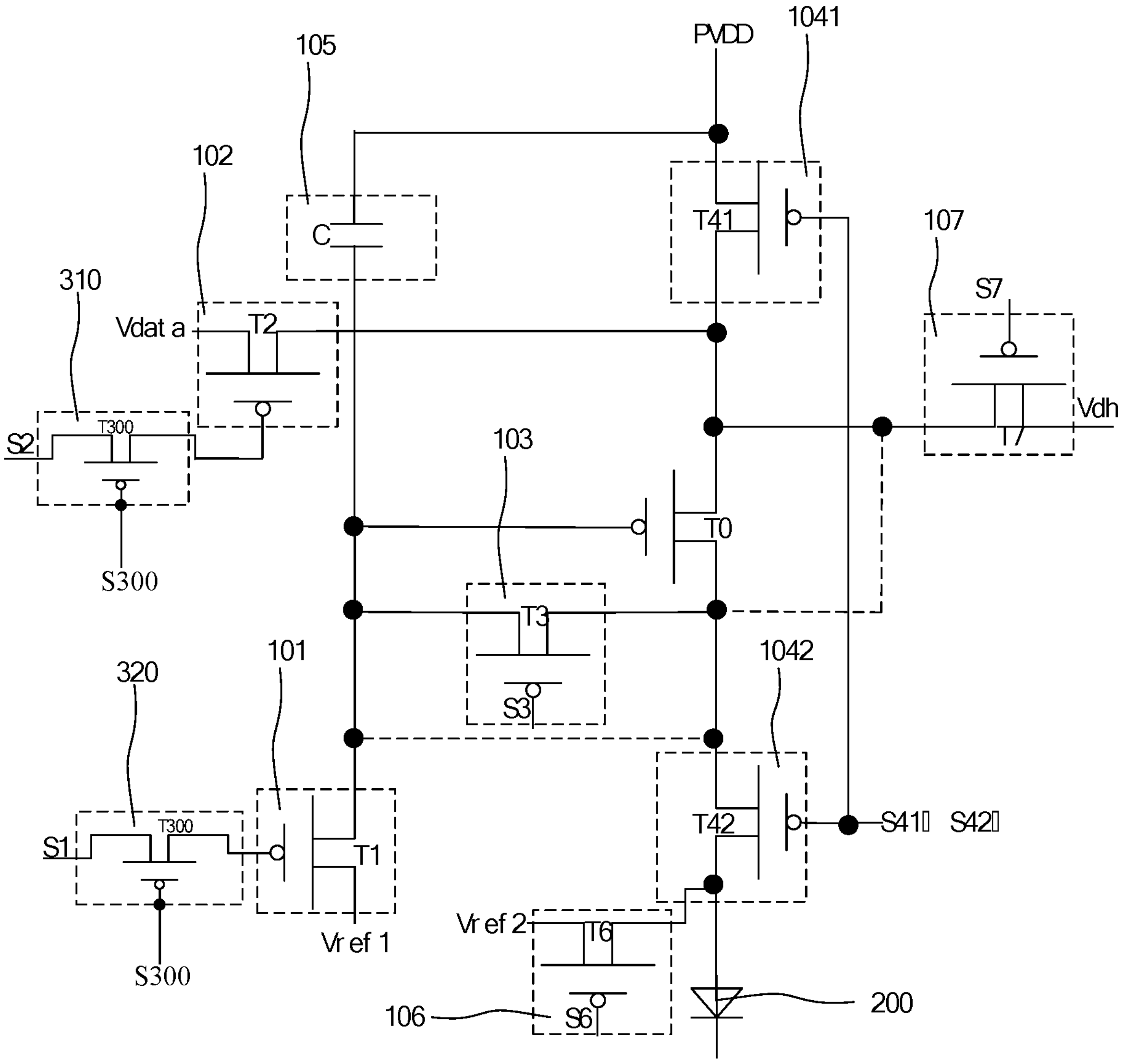
FIG. 21 illustrates another exemplary display panel according to various disclosed embodiments of the present disclosure.

The embodiments of the present disclosure do not specifically limit the types of the first preset module and the second preset module. As shown in FIG. 21, which is a schematic structural diagram of another exemplary display panel provided by an embodiment of the present disclosure, the display panel provided by the present disclosure may include a data writing module 102, a reset module 101 and a compensation module 103. The first terminal of the data writing module 102 may be connected to the first terminal of the driving transistor T0, the second terminal of the data writing module 102 may be connected to the data signal terminal Vdata, and the control terminal of the data writing module 102 may be connected to the data writing control signal line S2. The data writing module 102 may be configured to provide data signals for the driving transistor T0. The first terminal of the reset module 101 may be connected to the gate of the driving transistor T0 (or the first terminal of the reset module 101 may be connected to the second terminal of the driving transistor T0 as shown by the dotted line in FIG. 5), and the second terminal of the reset module 101 may be connected to the reset signal terminal Vref1, and the control terminal of the reset module 101 may be connected to the reset control signal line S1. The reset module 101 may be configured for providing a reset signal for the driving transistor T0. The first terminal of the compensation module 103 may be connected to the gate of the driving transistor T0, the second terminal of the compensation module 103 may be connected to the second terminal of the driving transistor T0, the control terminal of the compensation module 103 may be connected to the compensation control signal line S3. The compensation module 103 may be configured to compensate the threshold voltage deviation of the driving transistor T0.

As shown in FIG. 21, the first preset module provided by the embodiment of the present disclosure may be the data writing module 102, and the second preset module may be the reset module 101. In other embodiments of the present disclosure, the first preset module may be a data writing module, and the second preset module may be a compensation module; or, the first preset module may be a reset module, and the second preset module may be a compensation module.

FIGS. 22-25 describe the exemplary embodiments in which the gating module 300 may be connected between the first terminal of the preset module 10*x* and the driving transistor T0, or the gating module 300 may be connected between the second terminal of the preset module 10*x* and the preset module 10*x* or the driving transistor T0 in detail.

Figure 22:
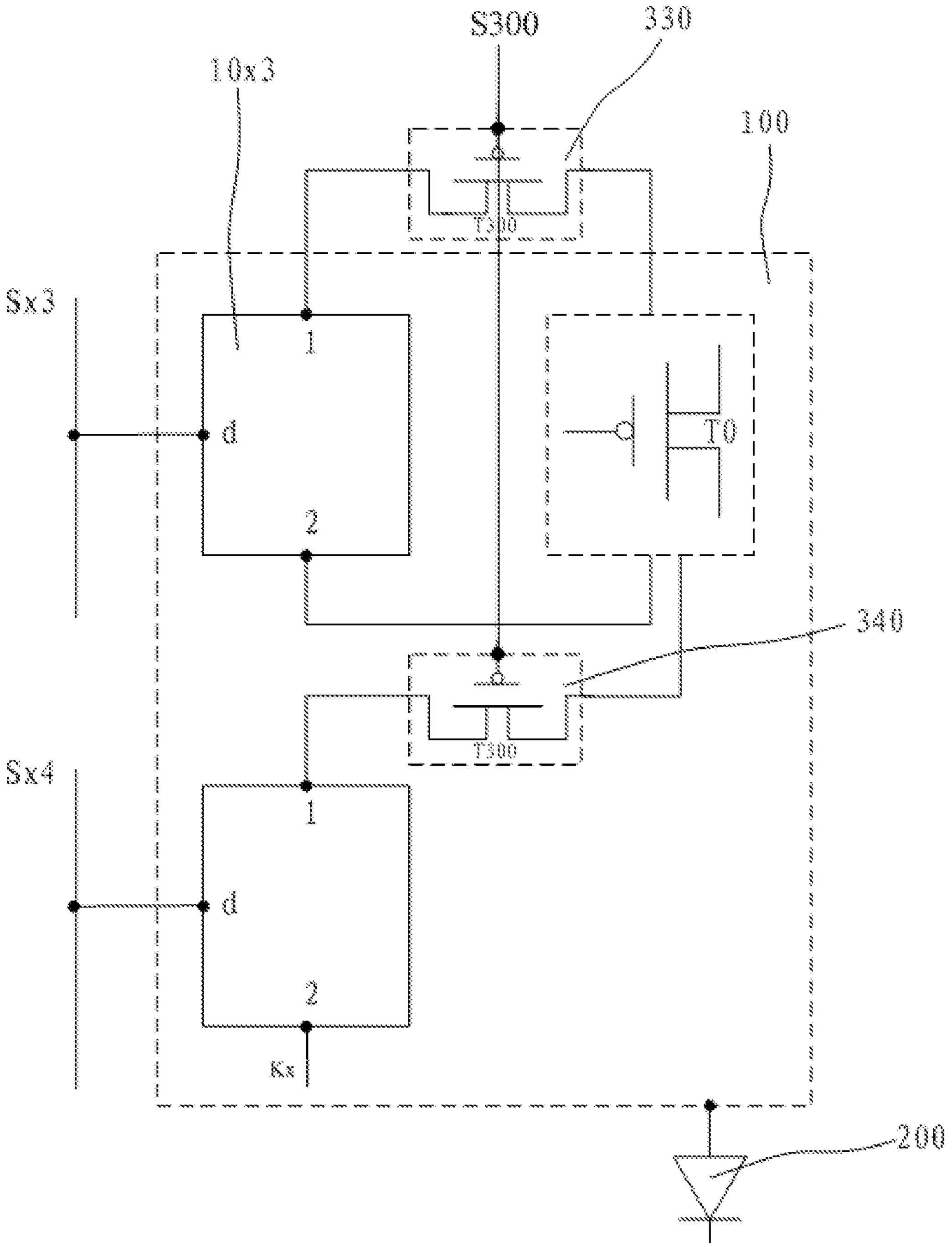
FIG. 22 illustrates another exemplary display panel according to various disclosed embodiments of the present disclosure.

In one embodiment of the present disclosure, the gating module may be connected between the first terminal of the preset module and the driving transistor. FIG. 22 is a schematic structural diagram of another exemplary display panel provided by an embodiment of the present disclosure. As shown in FIG. 22, the preset module of the display panel may include a third preset module 10X3 and a fourth preset module 10X4. At least one terminal of the third preset module 10*x*3 and at least one terminal of the fourth preset module 10*x*4 may be connected to different nodes. The control terminal of the third preset module 10*x*3 may be connected to the third control signal line Sx3, and the control terminal of the fourth preset module 10*x*4 may be connected to the fourth control signal line Sx4. The gating module may include a third gating module 330 and a fourth gating module 340. The third gating module 330 may be connected between the first terminal of the third preset module 10*x*3 and the driving transistor T0. The fourth gating module 340 may be connected between the first terminal of the fourth preset module 10*x*4 and the driving transistor T0.

Figure 23:
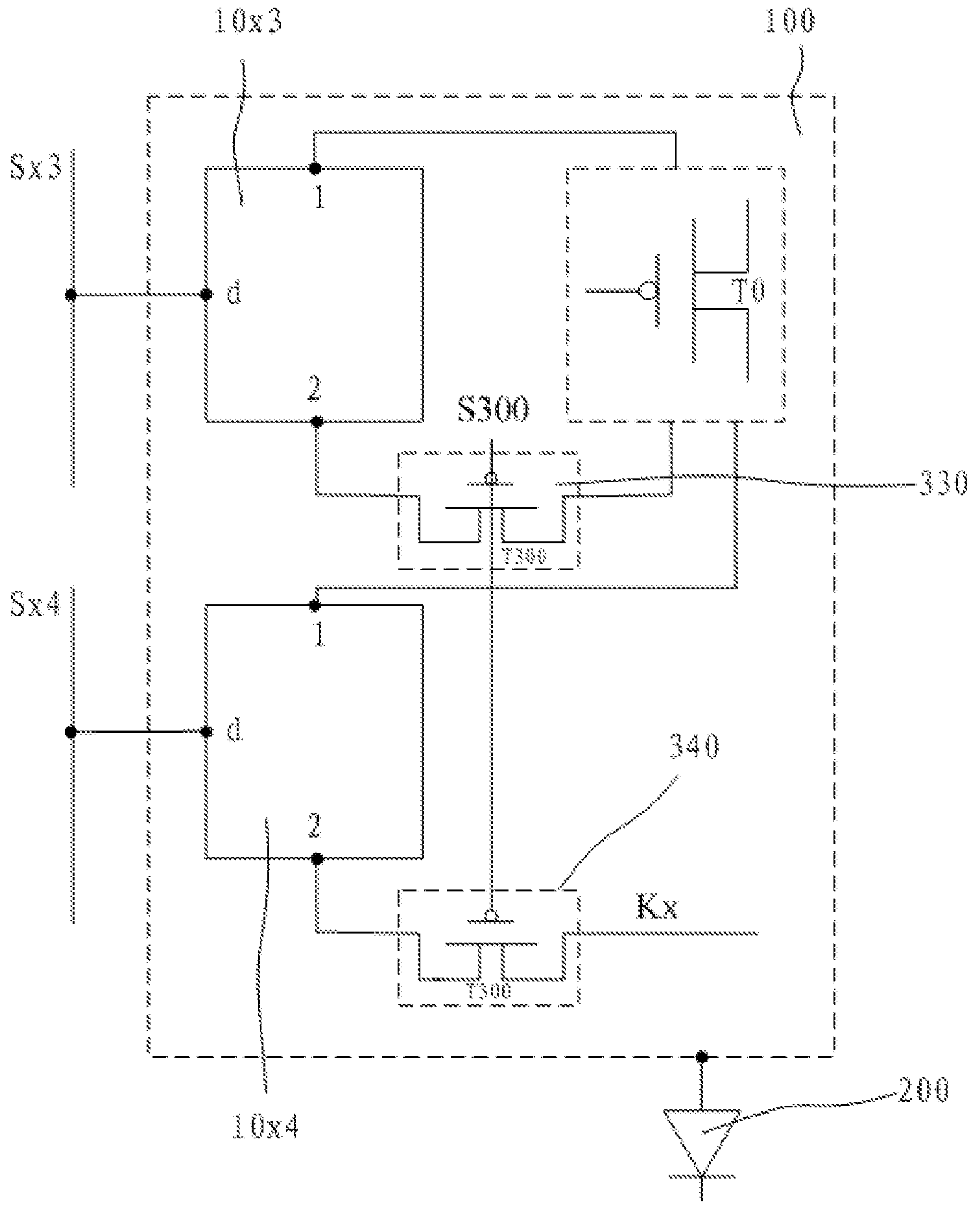
FIG. 23 illustrates another exemplary display panel according to various disclosed embodiments of the present disclosure.

In another embodiment, the gating module provided in the embodiment of the present disclosure is connected between the second terminal of the preset module and the preset signal terminal or the driving transistor. FIG. 23 is a schematic structural diagram of another display panel provided by an embodiment of the present disclosure. As shown in FIG. 23, the preset module of the display panel may include a third preset module 10*x*3 and a fourth preset module 10*x*4. At least one terminal of the third preset module 10*x*3 and at least one terminal of the fourth preset module 10*x*4 may be connected to different nodes. The control terminal of the third preset module 10*x*3 may be connected to the third control signal line Sx3. The control terminal of the fourth preset module 10*x*4 may be connected to the fourth control signal line Sx4. The gating module may include a third gating module 330 and a fourth gating module 340. The third gating module 330 may be connected between the second terminal of the third preset module 10*x*3 and the preset signal terminal Kx or the driving transistor T0. The fourth gating module 340 may be connected between the second terminal of the fourth preset module 10*x*4 and the preset signal terminal Kx or the driving transistor T0.

In one embodiment of the present disclosure, the control terminal of the third gating module 330 and the control terminal of the fourth gating module 340 may receive the same gating signal. When the conduction types of the gating transistor T300 included in the third gating module 330 and the gating transistor T300 included in the fourth gating module 340 are same, the control terminal of the third gating module 330 and the control terminal of the fourth gating module 340 may be connected to the same gating signal line S300. Accordingly, the wiring terminals may be reduced, and a relatively large wiring space may be ensured.

Figure 24:
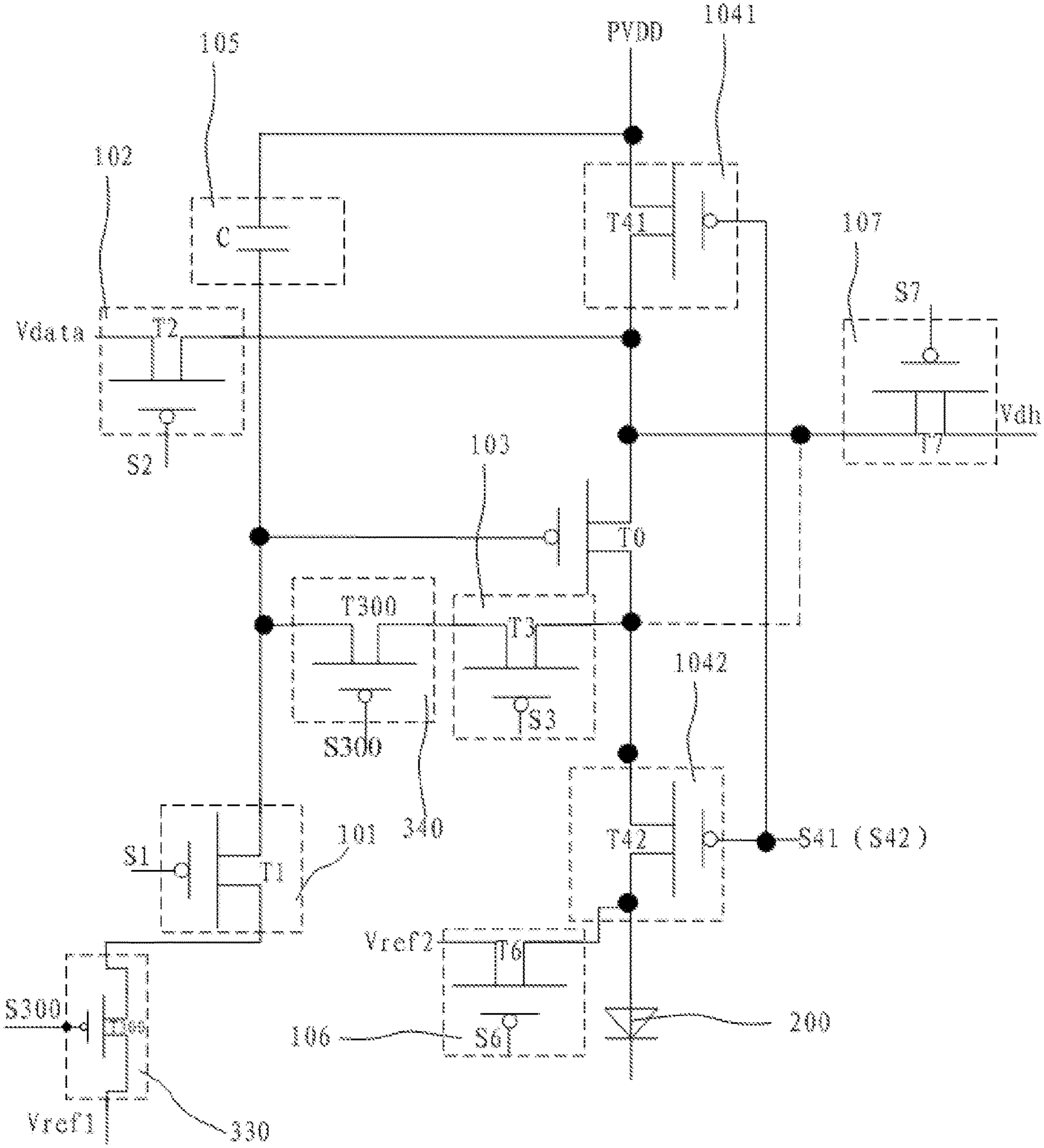
FIG. 24 illustrates another exemplary display panel according to various disclosed embodiments of the present disclosure.

The present disclosure does not limit the types of the third preset module and the fourth preset module. As shown in FIG. 24, which is a schematic structural diagram of another exemplary display panel provided by an embodiment of the present disclosure, the display panel provided by the present disclosure may include a data writing module 102, a reset module 101 and a compensation module 103. The first terminal of the data writing module 102 may be connected to the first terminal of the driving transistor T0, the second terminal of the data writing module 102 may be connected to the data signal terminal Vdata, and the control terminal of the data writing module 102 may be connected to the data writing control signal line S2. The data writing module 102 may be used to provide data signals for the driving transistor T0. The first terminal of the reset module 101 may be connected to the gate of the driving transistor T0 (or the first terminal of the reset module 101 may be connected to the second terminal of the driving transistor T0 as shown by the dotted line in FIG. 5), and the second terminal of the reset module 101 may be connected to the reset signal terminal Vref1, and the control terminal of the reset module 101 may be connected to the reset control signal line S1. The reset module 101 may be configured for providing a reset signal for the driving transistor T0. The first terminal of the compensation module 103 may be connected to the gate of the driving transistor T0, the second terminal of the compensation module 103 may be connected to the second terminal of the driving transistor T0, the control terminal of the compensation module 103 may be connected to the compensation control signal line S3. The compensation module 103 may be configured to compensate the threshold voltage deviation of the driving transistor T0.

As shown in FIG. 24, the third preset module may be a reset module 101, and the fourth preset module may be a compensation module 103. In other embodiments of the present disclosure, the third preset module provided by the present disclosure may be a data writing module, and the fourth preset module may be a reset module. In other embodiments, the third preset module may be a data writing module, and the fourth preset module may be a compensation module.

Figure 25:
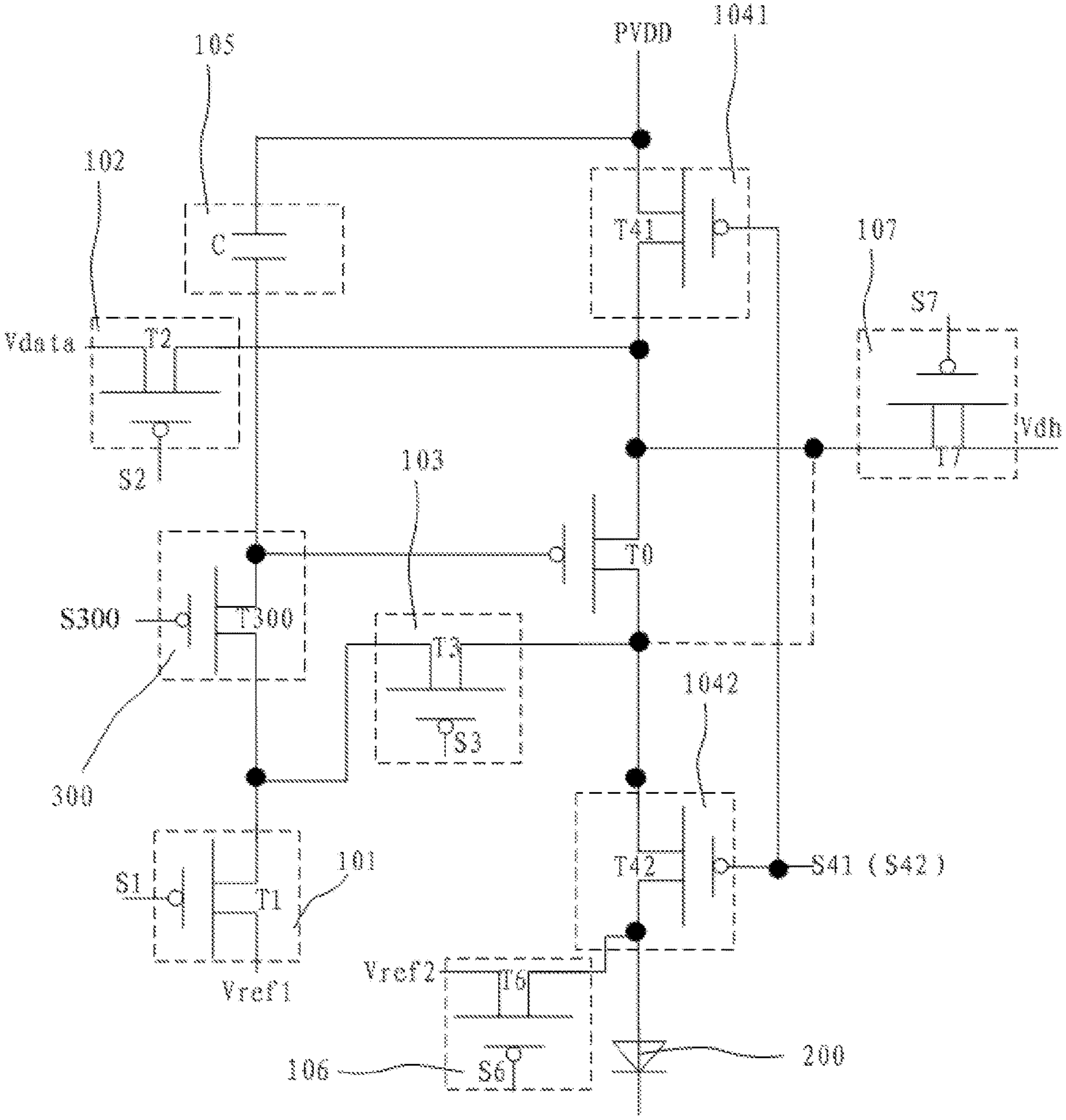
FIG. 25 illustrates another exemplary display panel according to various disclosed embodiments of the present disclosure.

As shown in FIG. 25, which is a schematic structural diagram of another exemplary display panel provided by the embodiment of the present disclosure, the third preset module of the display panel provided by the embodiment of the present disclosure may be the reset module 10, and the fourth preset module may be the compensation module 103. One terminal of the reset module 101 and one terminal of the compensation module 103 may be connected to one terminal of the same gating module 300, and the other terminal of the gating module 300 may be connected to the gate of the driving transistor T0. In such a configuration, the number of gating modules 300 may be reduced, and a large wiring space may be ensured.

Figure 26:
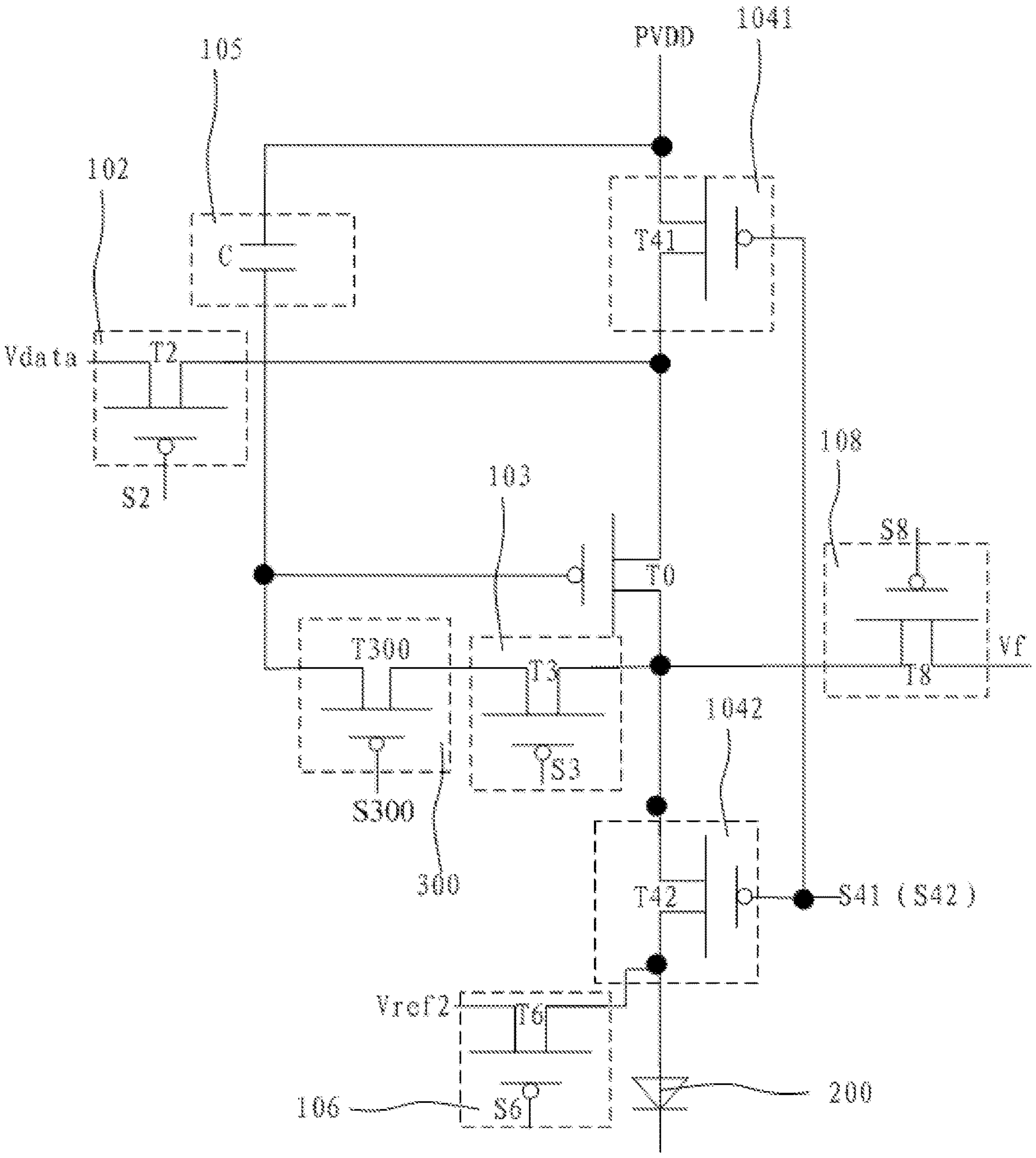
FIG. 26 illustrates another exemplary display panel according to various disclosed embodiments of the present disclosure.

FIG. 26 is a schematic structural diagram of another exemplary display panel provided by an embodiment of the present disclosure. As shown in FIG. 26, the preset module of the display panel provided by the embodiment of the present disclosure may the compensation module 103. The pixel circuit of the display panel may further include a composite adjustment module 108. The first terminal of the composite adjustment module 108 may be connected to the second terminal of the driving transistor T0, the second terminal of the composite adjustment module 108 may be connected to the composite adjustment signal terminal Vf, and the control terminal of the composite adjustment module 108 may be connected to the composite adjustment signal terminal S8. The gating module 300 may be connected between the first terminal of the compensation module 103 and the gate of the driving transistor T0, or the gating module 300 may be connected between the second terminal of the compensation module 103 and the second terminal of the driving transistor T0.

As shown in FIG. 26, the composite adjustment module 108 may include a composite adjustment transistor T8. The first terminal of the composite adjustment transistor T8 may be connected to the second terminal of the driving transistor T0, the second terminal of the composite adjustment transistor T8 may be connected to the composite adjustment signal terminal Vf, and the gate of the composite adjustment transistor T8 may be connected to the composite adjustment control signal terminal S8.

It can be understood that the composite adjustment module 108 provided in the embodiment of the present disclosure may multiplex the reset module and a set of bias adjustment modules. During the reset stage, the composite adjustment signal terminal Vf may output a reset signal, and the composite adjustment module 108 may transmit the reset signal to the second terminal of the driving transistor T0, the reset signal may be transmitted to the gate of the driving transistor T0 through the compensation module 103 and the gating module 300 for reset. In the bias adjustment stage, the composite adjustment signal terminal Vf may output the bias adjustment signal, and the composite adjustment module 108 may transmit the bias adjustment signal to the second terminal of the driving transistor T0.

For example, the operation process of the pixel circuit provided by the embodiment of the present disclosure may include a reset stage and a bias adjustment stage. In the reset stage, the composite adjustment signal terminal Vf may provide a reset signal, and when the composite adjustment module 108, the compensation module 103 and the gating module 300 are all turned on, the gate of the driving transistor T0 may receive the reset signal. In the bias adjustment stage, the composite adjustment module 108 may be turned on, and the composite adjustment signal terminal Vf may provide a bias adjustment signal. The voltage value of the reset signal may be different from the voltage value of the bias adjustment signal.

In one embodiment of the present disclosure, in the bias adjustment stage, at least one of the compensation module 103 and the gating module 300 may be turned off, or both of them may be turned off, thus the path between the second terminal and the gate of the driving transistor T0 may be turned off to prevent the bias adjustment signal from affecting the gate potential of the driving transistor T0.

In one embodiment of the present disclosure, the control terminal of the composite adjustment module 108 may receive a composite adjustment control signal, and the pulse change frequency of the composite adjustment control signal may be greater than the pulse change frequency of the gating signal. Setting the pulse change frequency of the composite adjustment control signal to be greater than the pulse change frequency of the gating signal may be able to, on the basis that the gating signal may adjust the data refresh frequency of the pixel circuit, control the pixel circuit to operate normally through the composite adjustment control signal in the enabling stage of the gating signal.

The present disclosure also provides a display device. The display device may include one of the present disclosed display panels, or other appropriate display panel.

Figure 27:
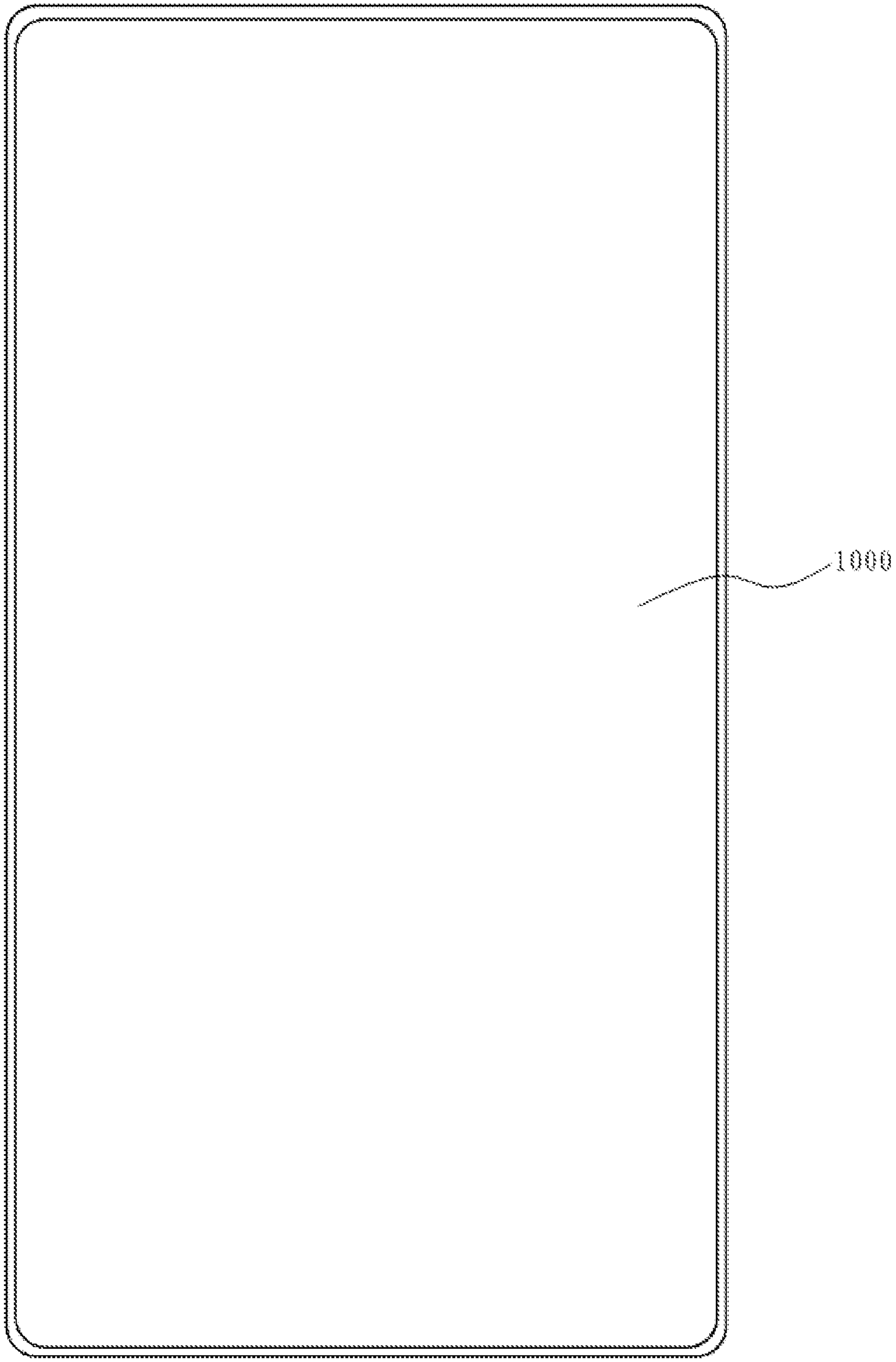
FIG. 27 illustrates an exemplary display device according to various disclosed embodiments of the present disclosure.

FIG. 27 is a schematic structural diagram of an exemplary display device provided by an embodiment of the present disclosure. The display device1000 provided by an embodiment of the present disclosure may be a mobile terminal device.

In some embodiments, the display device provided by the present disclosure may also be an electronic display device, such as a computer and a wearable display device, which is not specifically limited by the present disclosure.

Embodiments of the present disclosure provide a display panel and a display device. In a pixel circuit of the display panel, a gating module may be disposed between a preset module and a control signal line, or between a preset module and a driving transistor, or between the preset module and the preset signal terminal. By optimizing the operation frequency of the gating module, the purpose of changing the operation frequency of the pixel circuit may be achieved. For example, the technical solution provided by the embodiment of the present disclosure may realize the refresh of operation frequencies of different display areas of the display panel on the basis of not changing the pulse change frequency of the output control signal of the driving circuit of the display device by optimizing the frequency of the gating module during the operation. Accordingly, the driving display effect of the display device may be ensured as expected.

In the description of the present disclosure, it is to be understood that the terms “center”, “longitudinal”, “lateral”, “length”, “width”, “thickness”, “upper”, “lower”, “front” “back”, “left”, “right”, “vertical”, “horizontal”, “top”, “bottom”, “inside”, “outside”, “clockwise”, “counterclockwise”, “axial”, “radial”, and “circumferential”, etc. indicate the orientation or positional relationship based on the orientation or positional relationship shown in the accompanying drawings, which are only for the convenience of describing the present disclosure and simplifying the description, rather than indicating or implying the indicated device or elements must have a particular orientation, be constructed and operate in a particular orientation, and therefore should not be construed as limiting the present disclosure.

Further, the terms “first” and “second” are only for descriptive purposes only, and should not be understood as indicating or implying relative importance or implying the number of indicated technical features. Thus, a feature delimited with “first”, or “second” may expressly or implicitly include at least one of those features. In the description of the present disclosure, “plurality” means at least two, such as two, three, etc., unless otherwise expressly and specifically defined.

In the present disclosure, unless otherwise expressly specified and limited, such terms as “installed”, “connected”, “bonded” and “fixed” should be understood in a broad sense, for example, it may be a fixed connection or a detachable connection. It can be a mechanical connection or a connection or communication with each other. It can be directly connected or indirectly connected through an intermediate medium, or it can be the internal communication of two elements or the interaction relationship between the two elements, unless otherwise expressly qualified. For those of ordinary skill in the art, the specific meanings of the above terms in the present disclosure can be understood according to specific situations.

In the present disclosure, unless otherwise expressly specified and limited, a first feature “on” or “under” a second feature may be in direct contact between the first and second features, or the first and second features indirectly through an intermediary contact. Also, the first feature being “above”, “over” and “on” the second feature may mean that the first feature is directly above or obliquely above the second feature, or simply means that the first feature is level higher than the second feature. The first feature being “below”, “under” and “beneath” the second feature may mean that the first feature is directly below or obliquely below the second feature, or simply means that the first feature has a lower level than the second feature.

In the present disclosure, when the terms “one embodiment”, “some embodiments”, “example”, “specific example”, or “some examples”, etc. appear, they may mean the specific features, and structures included in at least one embodiment or example of the present disclosure. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine and combine the different embodiments or examples described in this specification, as well as the features of the different embodiments or examples, without conflicting each other.

Although the embodiments of the present disclosure have been shown and described above, it should be understood that the above-mentioned embodiments are exemplary and should not be construed as limiting the present disclosure. Embodiments are subject to variations, modifications, substitutions and variations by those skilled in the art.

What is claimed is:

1. A display panel, comprising:

a pixel circuit including a driving transistor and a preset module, wherein a first terminal of the preset module is connected to the driving transistor, a second terminal of the preset module is connected to a preset signal terminal or the driving transistor, and a control terminal of the preset module is connected to a control signal line that is configured for receiving a control signal;

a light-emitting element; and a gating module, wherein a control terminal of the gating module is connected to a gating signal line that is configured for receiving a gating signal, wherein:

the gating module is connected between the first terminal of the preset module and the driving transistor, or between the second terminal of the preset module and the preset signal terminal or the driving transistor;

the preset module comprises:

a third preset module; and a fourth preset module, wherein:

at least one terminal of the third preset module and at least one terminal of the fourth preset module are connected to different nodes; and the gating module comprises:

a third gating module; and a fourth gating module, wherein:

the third gating module is connected between the first terminal of the third preset module and the driving transistor, or the third gating module is connected between the second terminal of the third preset module and the preset signal terminal or the driving transistor; and/or, the fourth gating module is connected between a first terminal of the fourth preset module and the driving transistor, or the fourth gating module is connected between the second terminal of the fourth preset module and the preset signal terminal or the driving transistor; and the third gating module and the fourth gating module receive a same gating signal.

2. The display panel according to claim 1, wherein:

in at least a portion of an operation process of the display panel, a pulse change frequency of the gating signal is F, and a pulse change frequency of the control signal is Fc, and $F \neq Fc$.

3. The display panel according to claim 2, wherein:

$F<Fc$.

4. The display panel according to claim 1, comprising:

a first display area; and a second display area, wherein the pixel circuit includes a first pixel circuit and a second pixel circuit, the first pixel circuit is connected to a light-emitting element in the first display area, and the second pixel circuit is connected to a light-emitting element in the second display area.

5. The display panel according to claim 4, wherein:

in at least a portion of an operation process of the display panel, a pulse change frequency of the gating signal received by the gating module connected to the first pixel circuit is F1, and a pulse change frequency of the gating signal received by the gating module connected to the second pixel circuit is F2; and $F1 \neq F2$.

6. The display panel according to claim 5, wherein:

a data refresh frequency of the first pixel circuit is greater than a data refresh frequency of the second pixel circuit; and $F1>F2$.

7. The display panel according to claim 4, wherein:

one of the first pixel circuit and the second pixel circuit does not include a gating module, and the other one of the first pixel circuit and the second pixel includes the gating module.

8. The display panel according to claim 7, wherein:

when the first pixel circuit does not include the gating module and the second pixel circuit includes the gating module, the data refresh frequency of the first pixel circuit is greater than the data refresh frequency of the second pixel circuit.

9. The display panel according to claim 1, comprising:

a data writing module;

a reset module; and a compensation module, wherein:

a first terminal of the data writing module is connected to a first terminal of the driving transistor, the preset signal terminal includes a data signal terminal, a second terminal of the data writing module is connected to the data signal terminal, and the data writing module is configured for providing a data signal for the driving transistor;

a first terminal of the reset module is connected to a gate or a second terminal of the driving transistor, the preset signal terminal includes a reset signal terminal, a second terminal of the reset module is connected to the reset signal terminal, and the reset module is configured for providing a reset signal for the driving transistor; and a first terminal of the compensation module is connected to a gate of the driving transistor, a second terminal of the compensation module is connected to a second terminal of the driving transistor, and the compensation module is configured for compensating a threshold voltage deviation of the driving transistor, wherein:

the third preset module is a data writing module, and the fourth preset module is a reset module; or the third preset module is a data writing module, and the fourth preset module is a compensation module; or the third preset module is a reset module, and the fourth preset module is a compensation module.

10. The display panel according to claim 9, wherein:
the third preset module is the reset module; and
the fourth preset module is the compensation module,
wherein one terminal of the reset module and one terminal of the compensation module are connected to one terminal of the same gating module, and another terminal of the gating module is connected to a gate of the driving transistor.

11. The display panel according to claim 9, wherein:
when the fourth preset module is a compensation module the pixel circuit further includes a composite adjustment module; and
a first terminal of the composite adjustment module is connected to the second terminal of the driving transistor, and a second terminal of the composite adjustment module is connected to a composite adjustment signal terminal,
wherein the gating module is connected between a first terminal of the compensation module and the gate of the driving transistor, or the gating module is connected between a second terminal of the compensation module and the second terminal of the driving transistor.

12. The display panel according to claim 11, wherein:
an operation process of the pixel circuit includes a reset stage and a bias adjustment stage;
in the reset stage, the composite adjustment signal terminal provides a reset signal, and when the composite adjustment module, the compensation module and the gating module are all turned on, the gate of the driving transistor receives the reset signal;
in the bias adjustment stage, the composite adjustment module is turned on, and the composite adjustment signal terminal provides a bias adjustment signal; and
a voltage value of the reset signal is different from a voltage value of the bias adjustment signal.

13. The display panel according to claim 12, wherein:
in the bias adjustment stage, at least one of the compensation module and the gating module is turned off.

14. The display panel according to claim 12, wherein the pixel further comprises:
a control terminal of the composite adjustment module receives a composite adjustment control signal; and
a pulse change frequency of the composite adjustment control signal is greater than the pulse change frequency of the gating signal.

15. A display device, comprising:
a display panel, including:
a pixel circuit including a driving transistor and a preset module, wherein a first terminal of the preset module is connected to the driving transistor, and a second terminal of the preset module is connected to a preset signal terminal or the driving transistor, a control terminal of the preset module is connected to a control signal line that is configured for receiving a control signal;
a light-emitting element; and
a gating module, wherein a control terminal of the gating module is connected to a gating signal line that is configured for receiving a gating signal, wherein:
the gating module is connected between the control terminal of the preset module and the control signal line, or between the first terminal of the preset module and the driving transistor, or between the second terminal of the preset module and the preset signal terminal or the driving transistor;
the preset module comprises:
a third preset module; and
a fourth preset module, wherein:
at least one terminal of the third preset module and at least one terminal of the fourth preset module are connected to different nodes; and
the gating module comprises:
a third gating module; and
a fourth gating module, wherein:
the third gating module is connected between the first terminal of the third preset module and the driving transistor, or the third gating module is connected between the second terminal of the third preset module and the preset signal terminal or the driving transistor; and/or,
the fourth gating module is connected between a first terminal of the fourth preset module and the driving transistor, or the fourth gating module is connected between the second terminal of the fourth preset module and the preset signal terminal or the driving transistor; and
the third gating module and the fourth gating module receive a same gating signal.

* * * * *